United States Patent
Ishii et al.

(10) Patent No.: US 6,758,112 B2
(45) Date of Patent: Jul. 6, 2004

(54) POWER TRANSMISSION ARRANGEMENT OF A WORKING VEHICLE AND TRANSMISSION FOR THE WORKING VEHICLE

(76) Inventors: Norihiro Ishii, 18-1, Inadera 2-Chome, Amagasaki-shi, Hyogo (JP), 661-0981; Hirohiko Kawada, 18-1, Inadera 2-Chome, Amagasaki-shi, Hyogo (JP), 661-0981; Hideki Kanenobu, 18-1, Inadera 2-Chome, Amagasaki-shi, Hyogo (JP), 661-0981; Hiroshi Tottori, 18-1, Inadera 2-Chome, Amagasaki-shi, Hyogo (JP), 661-0981; Kentaro Nagata, 18-1, Inadera 2-Chome, Amagasaki-shi, Hyogo (JP), 661-0981

( * ) Notice: Subject to any disclaimer, the term of this patent is extended or adjusted under 35 U.S.C. 154(b) by 18 days.

(21) Appl. No.: 10/105,231

(22) Filed: Mar. 26, 2002

(65) Prior Publication Data

US 2002/0134183 A1 Sep. 26, 2002

(30) Foreign Application Priority Data

Mar. 26, 2001 (JP) .......................................... 2001-087609
Mar. 26, 2001 (JP) .......................................... 2001-087648
Feb. 1, 2002 (JP) .......................................... 2002-025081

(51) Int. Cl.[7] .......................... F16H 3/34; F16D 31/02; B60K 25/00
(52) U.S. Cl. ........................ 74/352; 180/53.8; 180/900; 60/454; 60/485
(58) Field of Search ............................... 74/606 R, 607; 180/53.8, 53.6, 374, 900; 60/454, 458, 455, 485; 475/83, 84

(56) References Cited

U.S. PATENT DOCUMENTS 5,046,994 A * 9/1991 Hasegawa et al. ............ 475/83
6,192,682 B1 * 2/2001 Smothers et al. ............. 60/488
6,199,380 B1 * 3/2001 Ishii ............................. 60/485
6,318,485 B1 * 11/2001 Osuga et al. ............... 180/53.8
6,324,842 B1 * 12/2001 Ishii ............................. 60/454
6,354,975 B1 * 3/2002 Thoma ......................... 475/83
6,622,825 B2 * 9/2003 Iida et al. .................. 184/6.25

FOREIGN PATENT DOCUMENTS

JP 63-159134 7/1988
JP 01-37298 11/1989

OTHER PUBLICATIONS

Patent Abstracts of Japan, translated abstract of Publication No. 63–159134, Transmission of Self–Running Working Vehicle, published Jul. 1988.

* cited by examiner

*Primary Examiner*—Tisha D Lewis
(74) *Attorney, Agent, or Firm*—Sterne, Kessler, Goldstein & Fox P.L.L.C.

(57) ABSTRACT

In a power transmission arrangement, a working unit includes a hydraulic power unit and a valve unit enclosed in a first bulging portion of a transmission case closer to an upper side or on a top surface thereof and connected with each other along a vehicle lengthwise direction. The first bulging portion is closer to a first lateral side along the vehicle width direction of the transmission case, while a hydraulic pump is located closer to a second lateral side. Hydraulic fluid is drawn from the transmission case, around a lower side of the hydraulic pump, through a suction port thereof, and discharged to a suction port of the valve unit. The hydraulic power unit includes a cylinder tube and piston, extending in the lengthwise direction, and support shaft, extending along the width direction, which is supported by the transmission case and connected to a lift arm.

13 Claims, 18 Drawing Sheets

POWER TRANSMISSION ARRANGEMENT OF A WORKING VEHICLE AND TRANSMISSION FOR THE WORKING VEHICLE

BACKGROUND OF THE INVENTION

1. Field of the Invention

The present invention relates to a power transmission arrangement in a working vehicle with a working unit such as a cultivating unit and mower unit attached thereto, and a transmission for the working vehicle.

2. Related Art

In a vehicle equipped with a working unit such as a bucket, cultivating unit and mower unit on the front side, rear side and/or below the lengthwise center of a chassis, driving power from a driving power source must be divided into a running power transmission path and a driving power transmission path for working unit so as to be transmitted to driving wheels and the working unit. This poses a problem of increasing a size of the transmission in the vehicle.

For example, Japanese Patent Application Publication No. Hei-01-17883 and Utility Model Application Publication No. Hei-01-37298 disclose arrangements, which are applicable to the vehicle of the above type, for downsizing the size of the transmission.

The transmission disclosed in each of the above-cited publications has an input shaft for the working unit (PTO input shaft) and a running power input shaft, which are respectively aligned in vertical and parallel relationship with each other, and a transmission case in which the power transmission path for working unit and the running power transmission path are arranged respectively closer to upper and lower sides thereof with occupation of spaces as much compact as possible in an attempt to reduce the size of the transmission.

Meanwhile, for the vehicle equipped with a working unit as mentioned above, a hydraulic power unit for operating the working unit must be provided in some cases, in addition to a power-take-off arrangement for taking off driving power for the working unit. As such a hydraulic power unit, it can be cited a hydraulic lift unit for lifting a cultivating unit mounted on the rear side of the chassis.

As described above, in each of the above-cited publications, although the downsizing of the transmission may be achieved by arranging the running power transmission path and the power transmission path for working unit within the transmission case respectively closer to the upper and lower sides thereof with occupation of spaces as much compact as possible, such downsizing was not considered for the transmission of the vehicle provided with the aforesaid hydraulic power unit.

Specifically, in a vehicle disclosed in each of the cited publications, a hydraulic power unit for reciprocating a cultivating unit or any other working unit is disposed on a top surface of the transmission, while a hydraulic pump for feeding pressurized fluid to the hydraulic power unit is supported on a rear wall of the transmission case.

More specifically, in the transmission described in each publication, a clutch shaft and an intermediate shaft, which constitute a part of the power transmission path for working unit (PTO system), extend below and on the opposite lateral sides of a PTO input shaft, so that an upper space of the transmission case is occupied by this PTO power transmission path. Accordingly, in this conventional transmission, it is not possible to secure within the transmission case closer to the upper side a space for accommodating the hydraulic pump for feeding pressurized fluid to the hydraulic power unit, a driving power transmission mechanism for the hydraulic pump, etc. For these reasons, the conventional transmission has the hydraulic pump supported on the rear wall of the transmission case and a rear end of the PTO input shaft extending through the rear wall of the transmission case, through which the hydraulic pump is driven.

Thus, for the vehicle equipped with the hydraulic pump, the hydraulic pump of the conventional transmission extending rearwards through the transmission case poses a difficulty in shortening the length of the transmission with the hydraulic pump.

Also, according to the above arrangement, working fluid reserved in the transmission case for the hydraulic power unit is once transmitted around the rear side of the transmission case and then to the upper side of the transmission case. Accordingly, a hydraulic fluid circulation path to the hydraulic power unit must be elongated, which necessitates application of an excessive load to the hydraulic pump.

As another disadvantage involved in the vehicle described in each cited publication, since the hydraulic power unit is disposed on the top surface of the transmission case, a higher position must be prepared for mounting of the hydraulic power unit. This arrangement poses a problem of increasing an vehicle height. Since a driving seat is above the hydraulic power unit in a general arrangement, this invites a difficulty for a driver to get on and off the seat.

As described above, the power transmission path for working unit of the conventional transmission is entirely located in the upper space of the transmission case. On the other hand, a mid-PTO shaft for driving a mid-mount more or the like is located in the lower space of the transmission case. Accordingly, a power transmission mechanism between the PTO input shaft and the mid-PTO shaft in the conventional transmission must be formed throughout the entire region of the transmission case along the vertical direction. This poses a problem of necessitating a complicated structure for the transmission mechanism.

The present invention was conceived in light of those conventional techniques. It is an object of the present invention to provide a transmission with the power transmission path for working unit and the running power transmission path, which is capable of achieving downsizing of the transmission case, as well as effectively securing a space for accommodating parts for the hydraulic lift unit or the like within the transmission case.

It is another object of the present invention to provide a power transmission arrangement in a vehicle provided with a working unit operable by a hydraulic power unit, which is capable of shortening a hydraulic fluid distribution path to the hydraulic power unit.

It is still another object of the present invention to provide a power transmission arrangement in a vehicle provided with a working unit operable by a hydraulic power unit, which is capable of stably supporting a cylinder tube of the hydraulic power unit at a lower position.

SUMMARY OF THE INVENTION

To achieve the above objects, there is provided a transmission for a working vehicle, which includes:

a transmission case providing an accommodation space therein for accommodating a differential gear unit as locating the same substantially below a lengthwise center of the transmission case, in which driving power with its speed changed from an engine is divided and transmitted right and left driving axles through the differential gear unit;

a PTO input shaft supported by the transmission case for receiving the driving power from the engine;

a running power input shaft supported by the transmission case for receiving the driving power from the engine via a transmission unit;

the PTO input shaft located with its rotational axis extending in a vehicle lengthwise direction substantially at a widthwise center of the transmission case along a vehicle width direction;

the running power input shaft located with its rotational axis extending in the vehicle lengthwise direction substantially at the same position as that of the PTO input shaft along the vehicle width direction and at a lower side of the PTO input shaft; and wherein the accommodation space for accommodating the differential gear unit is displaced to a first lateral side of the vehicle along the vehicle width direction, a running power transmission shaft is located on the front side of the space with its axis extending in the vehicle lengthwise direction, and the running power input shaft, the running power transmission shaft and the differential gear unit are interlocked to each other via a running power gear train;

a mid-PTO shaft having a front end protruding forwards through the transmission case, the mid-PTO shaft located within the transmission case closer to a second lateral side of the transmission case along the vehicle width direction and lower side of the transmission case with its axis extending in the vehicle lengthwise direction and its rear end reaching to a rear side of the transmission case;

a PTO power transmission shaft interlocked with the PTO input shaft via a main PTO gear train located on the front side of the transmission case, the PTO power transmission shaft located within the transmission case closer to the second lateral side along the vehicle width direction with its axis extending in the vehicle lengthwise direction and its rear end reaching to the rear side of the transmission case; and a mid-PTO gear train located within the transmission case closer to a rear side thereof for interlocking the PTO power transmission shaft with the mid-PTO power transmission shaft.

With the transmission having the above arrangement, it is possible to prevent increase in size of the transmission case, while providing within the transmission case a free space on the upper side of a running power transmission path. This free space may be utilized for example to accommodate constitutional parts of a hydraulic lift unit.

In addition, since the mid-PTO gear train is located within the transmission case closer to the rear side thereof, a distal end of the mid-PTO shaft, which is driven through the mid-PTO gear train can be positioned as close as possible to the driving axle. Accordingly, it is possible to provide a power transmission mechanism for connection between the mid-PTO shaft and the working unit driven by the mid-PTO shaft with an improved durability and noise prevention arrangement.

In the above arrangement, the PTO power transmission shaft and the mid-PTO shaft are displaced to the same lateral side along the vehicle width direction within the transmission case so as to position both the shafts as close as possible to each other. This can simplify a power transmission arrangement between both the shafts.

According to a preferable arrangement, the PTO power transmission shaft and the mid-PTO power transmission shaft are respectively located above and below the driving axles.

According to another preferable arrangement, the transmission further includes a rear PTO shaft having a rear end protruding rearwards through the transmission case located substantially at the widthwise center of the transmission case along the vehicle width direction and above the PTO power transmission shaft; and a rear PTO gear train for interlocking the PTO power transmission shaft with the rear PTO shaft having at least a part located closer to the first lateral side of the transmission case along the vehicle width direction than the PTO power transmission shaft is.

According to a still preferable arrangement, the transmission further includes a switching unit for selectively switching on/off power transmission from the PTO power transmission shaft to at least one of the mid-PTO gear train and the rear PTO gear train.

According to another aspect of the present invention, there is provided a power transmission arrangement in a working vehicle with a working unit mounted thereto, which includes:

an input shaft supported by a transmission case for receiving driving power for driving the working unit from a driving source;

a hydraulic power unit for the working unit and a valve unit for controlling feeding and discharging of pressurized fluid for the hydraulic power unit are connected with each other along a vehicle lengthwise direction within the transmission case closer to an upper side thereof or on a top surface of the transmission case, and closer to a first lateral side of the transmission case along the vehicle width direction;

a hydraulic pump driven through the input shaft is located closer to a second lateral side along the vehicle width direction than the hydraulic power unit and the valve unit are;

a fluid distribution path is arranged so that hydraulic fluid reserved within the transmission case is drawn around a lower side of the hydraulic pump and then fed into the hydraulic pump through a suction port thereof; and the hydraulic pump has a discharge port connected with a suction port of the valve unit.

With the aforesaid power transmission arrangement, it is possible to shorten a hydraulic fluid distribution path to the hydraulic power unit, and hence achieves downsizing of the hydraulic pump, downsizing of the vehicle and improved response rate of the hydraulic power unit.

According to a preferable arrangement, the power transmission arrangement further includes a filter located within the transmission case closer to a lower side thereof and substantially at the same position as that of the hydraulic pump with respect to the vehicle lengthwise direction; and the fluid distribution path arranged so that the hydraulic fluid reserved within the transmission case is fed into the suction port of the hydraulic pump through the filter.

According to still another aspect of the present invention, there is provided a power transmission arrangement in a working vehicle with a working unit mounted thereto in such a manner as to be vertically movable through a lift arm, which includes:

an input shaft for receiving driving power for driving the working unit from a driving source supported by a transmission case with a first bulging portion upwardly bulging at a position closer to a first lateral side of the transmission case along a vehicle width direction;

a hydraulic power unit for the working unit including a cylinder tube extending in a vehicle lengthwise direction, a piston reciprocably and fluid-tightly mounted within the cylinder tube and a supporting shaft operatively connected with the piston in such a manner as to be rotatable around its axis based upon reciprocal movement of the piston, in which the cylinder tube is located within a space defined by the first bulging portion, and the supporting shaft is supported by the transmission case so as to extend along the vehicle width direction and have at least one of first and second ends extending to the outside of the transmission case to form an outer extension, with which the lift arm is connected;

a hydraulic pump for feeding pressurized fluid into the hydraulic power unit located on a top surface of the transmission case closer to a second lateral side along the vehicle width direction than the first bulging portion is; and the input shaft being arranged so that driving power for the hydraulic pump is taken off therethrough.

With the aforesaid power transmission arrangement, it is possible to support the cylinder tube at a lower position, thereby lowering the vehicle height and increasing an operational efficiency of the hydraulic power unit.

According to a preferable arrangement, the transmission case is formed with a second bulging portion upwardly bulging at a position substantially at the same position as that of the hydraulic pump with respect to the vehicle width direction, and the hydraulic pump is supported on the second bulging portion.

According to a more preferable arrangement, the power transmission arrangement further includes at least a drive train extending from the input shaft to the hydraulic pump so that at least a portion thereof is placed within a space defined by the second bulging portion.

According to another preferable arrangement, the power transmission arrangement further includes a valve unit for controlling feeding and discharging of pressurized fluid for the hydraulic power unit connected with the cylinder tube so as to close one of open ends of the cylinder tube, the one of open ends being positioned opposite to another side of the cylinder tube, on which the supporting shaft is located; and a fluid distribution path being arranged so that hydraulic fluid reserved within the transmission case is drawn around a lower side of the hydraulic pump and then fed into the hydraulic pump through a suction port thereof. The hydraulic pump has a discharge port connected with a suction port of the valve unit.

According to still another preferable arrangement, a filter is located within the transmission case closer to a lower side thereof and substantially at the same position as that of the hydraulic pump along the vehicle lengthwise direction; and a fluid distribution path is so arranged that the hydraulic fluid reserved within the transmission case is fed into the suction port of the hydraulic pump through the filter.

According to another aspect of the present invention, there is provided a transmission for a working vehicle with a working unit mounted thereto in such a manner as to be vertically movable by a hydraulic power unit, which includes:

a transmission case designed to be capable of reserving hydraulic fluid therein;

a PTO input shaft supported by the transmission case and operatively connected with a hydraulic pump so as to operatively receive driving power from an engine; and a running power input shaft supported within the transmission case and operatively connected with a driving axle so as to operatively receive driving power from the engine via an HST; wherein the hydraulic pump is so designed as to feed pressurized fluid to the HST and the hydraulic power unit;

the transmission case includes a front supporting wall and a rear supporting wall aligned in series along a fore and aft direction of the vehicle to divide an inner space of the transmission case into a front chamber, a middle chamber and a rear chamber; and a hydraulic fluid distribution path being so arranged that hydraulic fluid returned from the HST and hydraulic fluid returned from the hydraulic power unit respectively flow into the front chamber and the rear chamber, and the hydraulic pump sucks the hydraulic fluid through the middle chamber.

With the above relatively simple arrangement, it is possible to effectively prevent hydraulic fluid, which has been heated to high temperature during circulation and returned from the HST and the hydraulic power unit, from being fed again to the HST and the hydraulic power unit before it is cooled. As a result, it is possible to effectively prevent deterioration in operational efficiency of the hydraulic pump, the HST and the hydraulic power unit.

According to a preferable arrangement, a PTO clutch for switching on/off power transmission from the PTO input shaft on a downstream side of the hydraulic pump along its power transmission path is placed within the front chamber, while a drive train for driving the PTO shaft is placed within the rear chamber. The front chamber is communicated with the rear chamber through an intermediate chamber, in which a PTO power transmission shaft for connection between the PTO clutch and the drive train is placed.

According to a more preferable arrangement, the transmission further includes a brake shaft located on an upstream side of the driving axle along its power transmission path, and a brake mechanism for applying braking force to the brake shaft. The brake shaft and the brake mechanism may be placed within the intermediate chamber. The intermediate chamber is designed to enable hydraulic fluid to flow thereinto from the front chamber and then flow out into the middle chamber. More preferably, the rear chamber is provided with an interior wall for temporarily receiving return fluid from the hydraulic power unit.

According to a still preferable arrangement, the transmission further includes a mechanical transmission unit for stepwisely varying the speed of driving power inputted to the running power input shaft and operatively transmitting the driving power to a driving axle. The mechanical transmission may be placed within the front chamber. An input end of the driving axle is placed within the middle chamber.

According to still another aspect of the present invention, there is provided a transmission for a working vehicle, which includes:

a transmission case that includes a body with its at least one side closer to a first lateral side of the transmission case along a vehicle width direction forming a lateral opening and a side cover for closing the lateral opening, a PTO input shaft supported by the transmission case and operatively connected with an engine, a PTO shaft supported by the transmission case so as to be able to output driving power to the outside of the transmission case, and a PTO power transmission mechanism constituting a driving power transmission path between the PTO input shaft and the PTO shaft, in which:

the PTO power transmission mechanism includes a clutch unit equipped with a hydraulic clutch mechanism capable of selectively transmitting or shutting off the driving power transmission path between the PTO input shaft and the PTO shaft;

the clutch unit includes a hydraulic brake mechanism for applying braking force to a rotational member of the PTO power transmission mechanism during shutting-off of the power transmission path by the hydraulic clutch unit;

the hydraulic brake mechanism includes a pressing member having a proximal end slidably fitted in a cylinder chamber and a distal end adapted to be brought into and released from engaging relationship with the rotational member of the PTO power transmission mechanism, so that the pressing member selectively applies braking force to and release the same from the PTO power transmission mechanism by controlling feeding of pressurized fluid to the cylinder chamber; and the cylinder chamber is formed in the side cover of the transmission case.

With the above arrangement, the cylinder chamber, which must be fluid tightly sealed, is not formed in the body of the transmission case but in the side cover, thereby omitting the necessity to work the body of the transmission with higher precision and therefore enabling the body to be relatively easily formed by casting.

According to a preferable arrangement, the hydraulic clutch mechanism and the hydraulic brake mechanism are actuated by working fluid fed from a common hydraulic pressure source. The side cover is provided with a working-fluid controlling member for controlling feeding of working fluid to the hydraulic clutch mechanism and the hydraulic brake mechanism and a pressurized-fluid distributor for distributing pressurized fluid into the hydraulic clutch mechanism and the hydraulic brake mechanism.

According to a more preferable arrangement, the working-fluid controlling member and the pressurized-fluid distributor are respectively and detachably attached on outer and inner surfaces of the side cover.

BRIEF DESCRIPTION OF THE DRAWINGS

The above, and other objects, features and advantages of the present invention will become apparent from the detailed description thereof in conjunction with the accompanying drawings wherein.

DETAILED DESCRIPTION OF THE PREFERRED EMBODIMENTS

Figure 1:
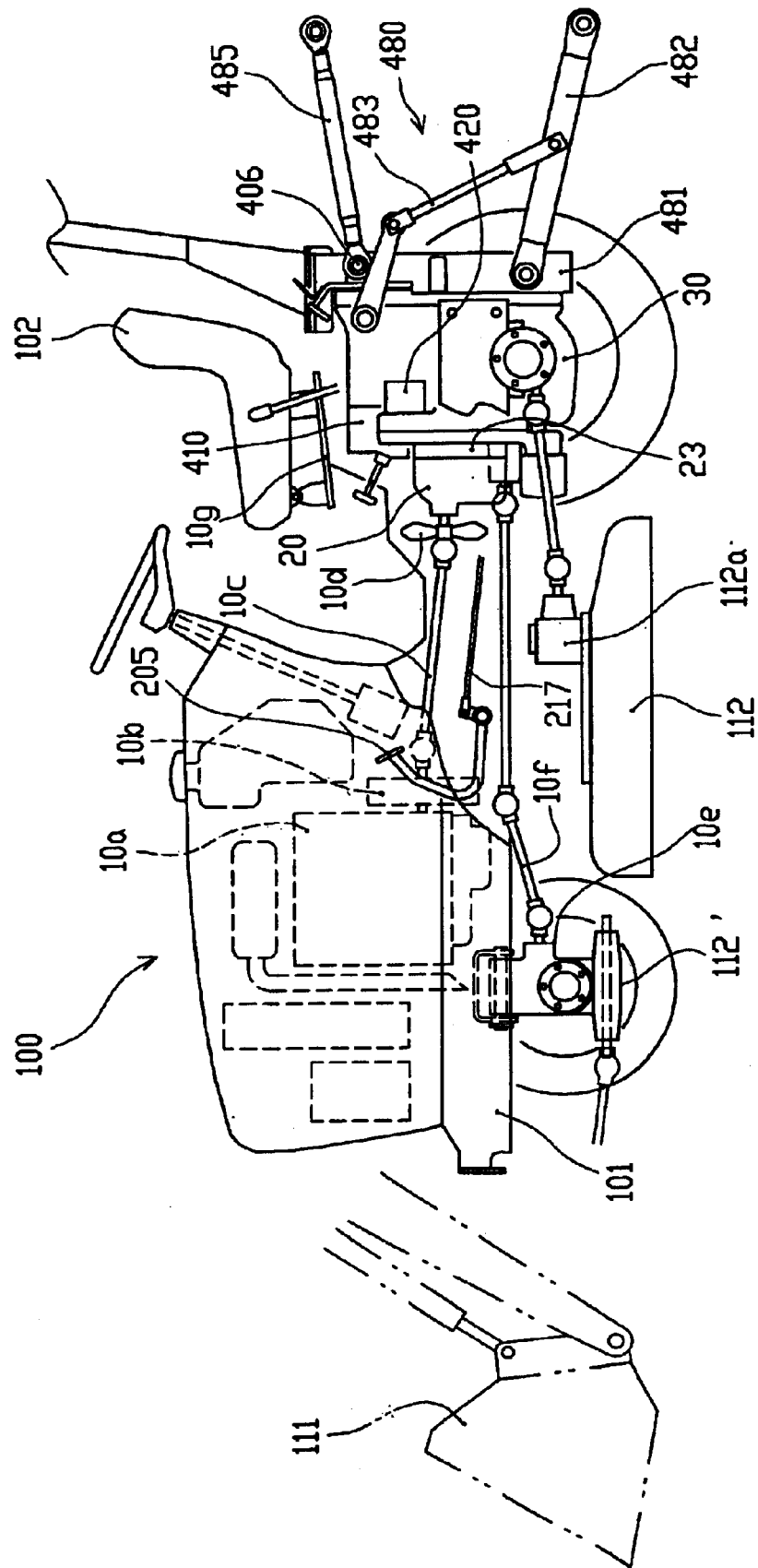
FIG. 1 is a model view illustrating a lateral side of a vehicle to which one embodiment of a power transmission arrangement of the present invention is applied.

The preferred embodiments of the present invention will be hereinafter described with reference to the drawings attached hereto. FIG. 1 is a model view illustrating a lateral side of vehicle 100 to which this embodiment is applied.

As illustrated in FIG. 1, the vehicle 100 is designed to mount working units such as bucket unit 111, mower unit 112 and cultivating unit (not shown) on the front side, lower side of a lengthwise center and rear side of the vehicle. Hereinafter, a working unit such as the mower 112 disposed just on the front side of transmission 30 will be referred to as a first working unit, while a working unit such as the cultivating unit disposed on the rear side of the transmission 30 is referred to as a second working unit.

The vehicle 100 has chassis 101 on which engine 10a, HST 20 and transmission 30 disposed in sequence along a vehicle lengthwise direction, and seat 102 disposed above the transmission 30.

Specifically, power output from the engine 10a is introduced into input shaft 21a of the HST 20 through an elastic joint (not shown) attached to a rotational center of flywheel 10b, and power transmission shaft 10c provided with universal joints at the opposite ends and tilted downwards towards the rear side of the vehicle.

Reference code 10d in FIG. 1 represents a cooling fan installed on one of the universal joints of the power transmission shaft 10c on its downstream side with respect to the power transmission path. Air streams generated by the cooling fan 10d are blown on the HST 20, transmission case 60 and the like to indirectly cool hydraulic fluid reserved within these members for circulation to respective parts. The cooling fan 10b is also designed to cool a hereinafter described line filter 68, auxiliary pump 420 and the like.

On the front upper side of the chassis 101 are mounted the engine 10a, and a radiator and a fuel tank related to the engine 10a. These are covered with a bonnet.

On the front lower side of the chassis 101 is supported front axle case 10e extending along a widthwise direction of the chassis. Specifically, the front axle case 10e is supported by a center pin, which is disposed at substantially the widthwise center of the chassis along the vehicle lengthwise direction, so that opposite ends of the front axle case 10e are vertically swingable. A front axle extends outwards through the opposite ends of the front axle case 10e to have outer extensions on which front wheels are fitted.

Reference code 10f in FIG. 1 represents a power transmission shaft for connection between a hereinafter-described front-wheel-driving-power-take-off shaft 53a, which protrudes forwardly through the transmission case 60, and an input shaft of the front axle case 10e. The power transmission shaft 10f includes a substantially horizontally extending first part that has a rear end connected with the front-wheel-driving-power-take-off shaft 53a via a universal joint, and a second part that is tilted downwards towards the front side of the vehicle, and has a rear end connected with a front end of the first part via a universal joint and a front end connected with the input shaft of the front axle case via a universal joint. The front wheels are driven by rotational power synchronized with rear wheels 180.

The seat 102 is mounted on mount stay 10g installed over a top surface of a rear portion of the transmission case 60 and a front surface of a hereinafter described valve unit 410.

Figure 2:
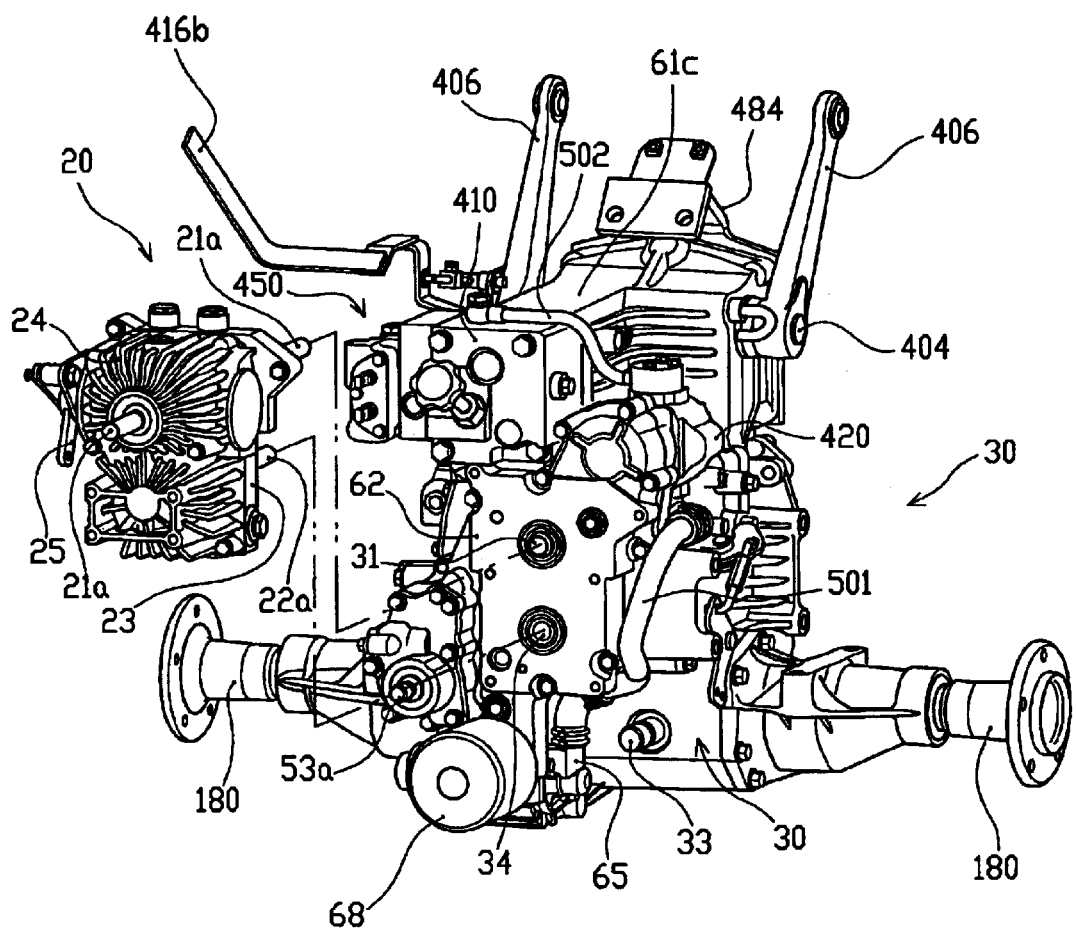
FIG. 2 is a partly exploded perspective view of an HST and a transmission in the power transmission arrangement according to the one embodiment of the present invention.
Figure 3:
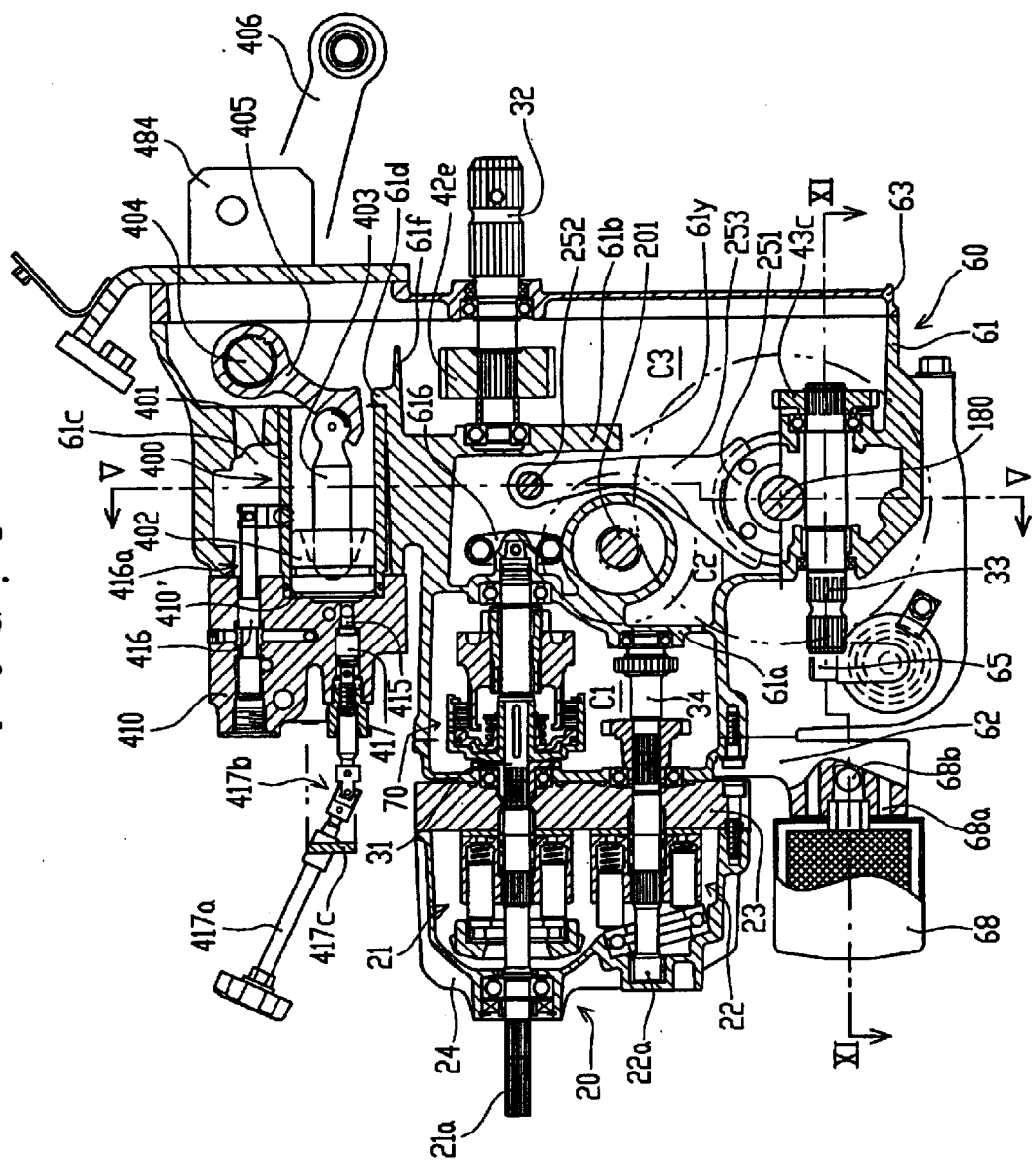
FIG. 3 is a longitudinal cross-section of the HST and the transmission illustrated in FIG. 2.
Figure 4:
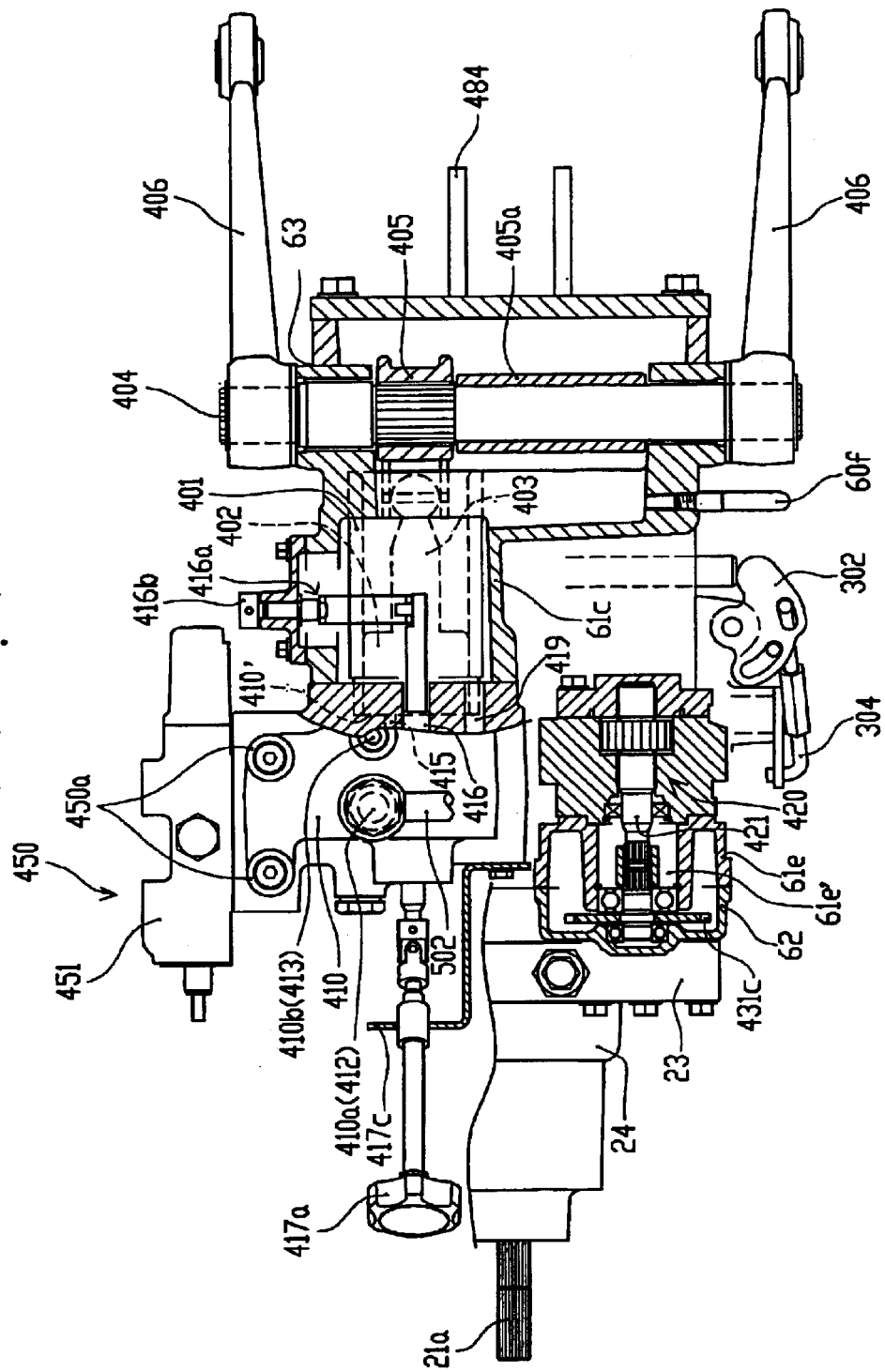
FIG. 4 is a partially cross-sectioned plan view of the HST and the transmission illustrated in FIG. 3.
Figure 5:
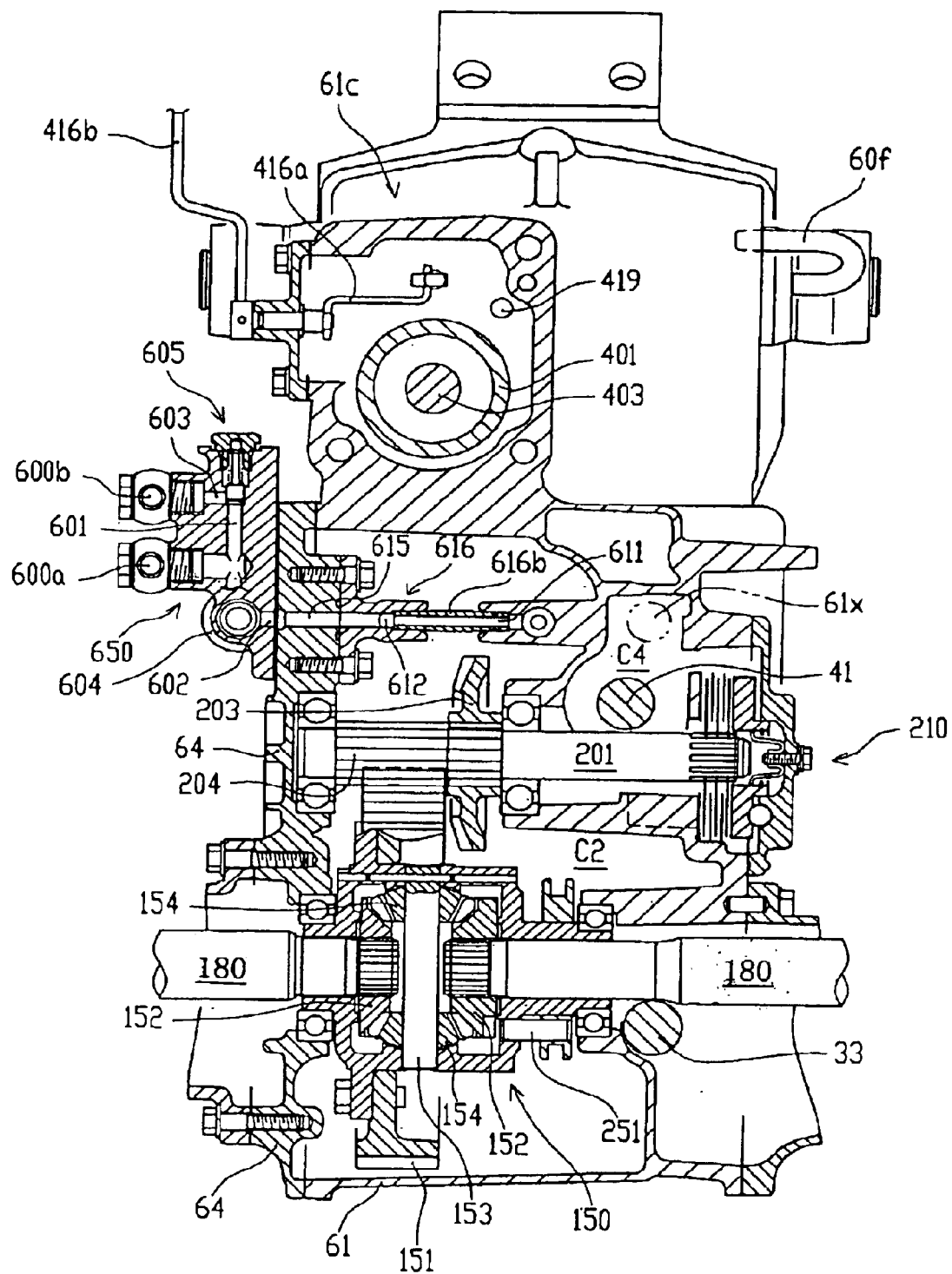
FIG. 5 is a cross-section taken along lines V—V in FIG. 3.

FIG. 2 is a partly exploded perspective view of the HST 20 and the transmission 30 in the power transmission arrangement of the aforesaid vehicle. FIGS. 3 and 4 are respectively a longitudinal cross-section and a partially cross-sectioned plan view of the HST 20 and the transmission 30. FIG. 5 is a cross-section taken along lines V—V in FIG. 3.

As illustrated in FIGS. 2 and 3, the HST 20 includes hydraulic pump body 21 having pump shaft 21a that is operatively connected with the engine 10 and disposed along the vehicle lengthwise direction, hydraulic motor body 22 that has motor shaft 22a disposed below the pump shaft 21a in parallel relationship therewith, center section 23 for supporting the hydraulic pump body 21 and the hydraulic motor body 22, and HST casing 24 connected with the center section 23 as enclosing the hydraulic pump body 21 and the hydraulic motor body 22.

The HST 20 is of a variable displacement type that enables at least one of the hydraulic pump body 21 and the hydraulic motor body 22 to vary the input/output flow rate based upon external operation, thereby varying the rotational number of the motor shaft 22a with respect to the pump shaft 21a. Specifically, the HST 20 includes output control arm 25 for controlling rotational output of the motor shaft 22a. The output control arm 25a is operatively connected with a throttle pedal for forward and rearward travel of the vehicle, which is disposed above a right step (not shown) installed on the chassis 101.

As illustrated in FIG. 3, rear ends of the pump shaft 21a and the motor shaft 22a extend through the center section 23 to have rear extensions adapted to be respectively connected with a hereinafter-described input shaft 31 for working unit (PTO input shaft) and input shaft 34 for running the vehicle (running power input shaft).

Figure 6:
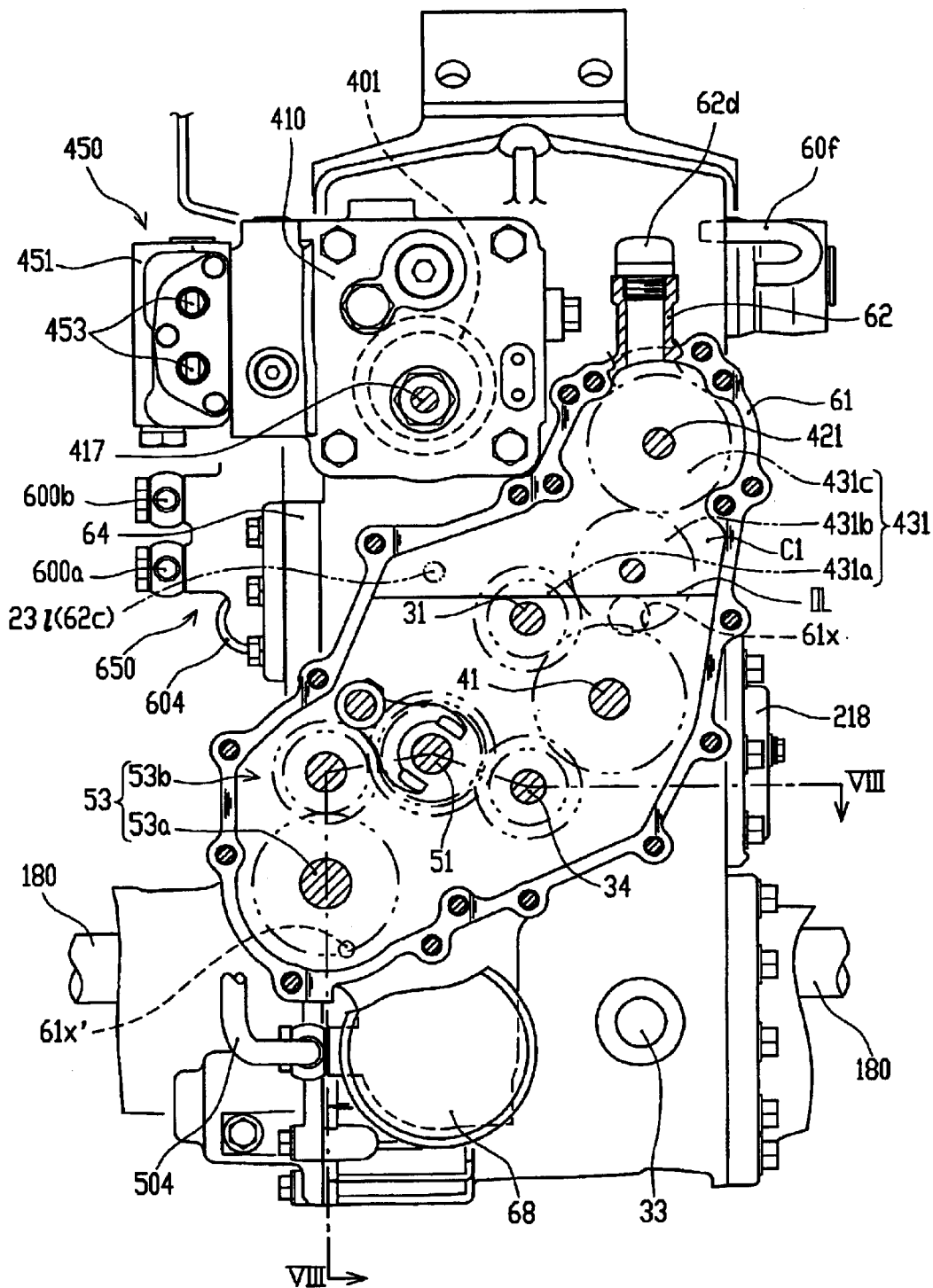
FIG. 6 is a front view of the transmission with a front cover removed.
Figure 7:
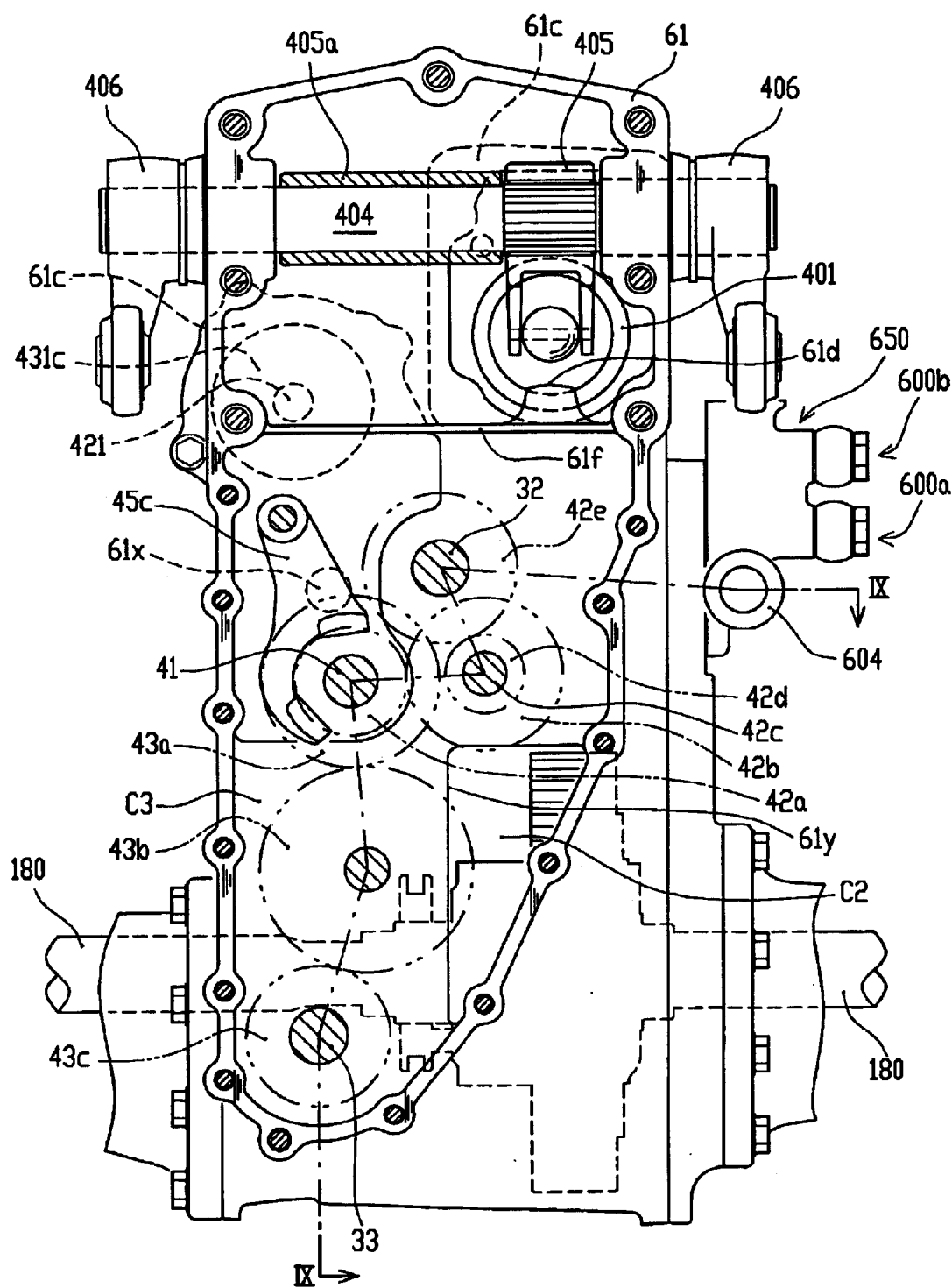
FIG. 7 is a rear view of the transmission with a rear cover removed
Figure 8:
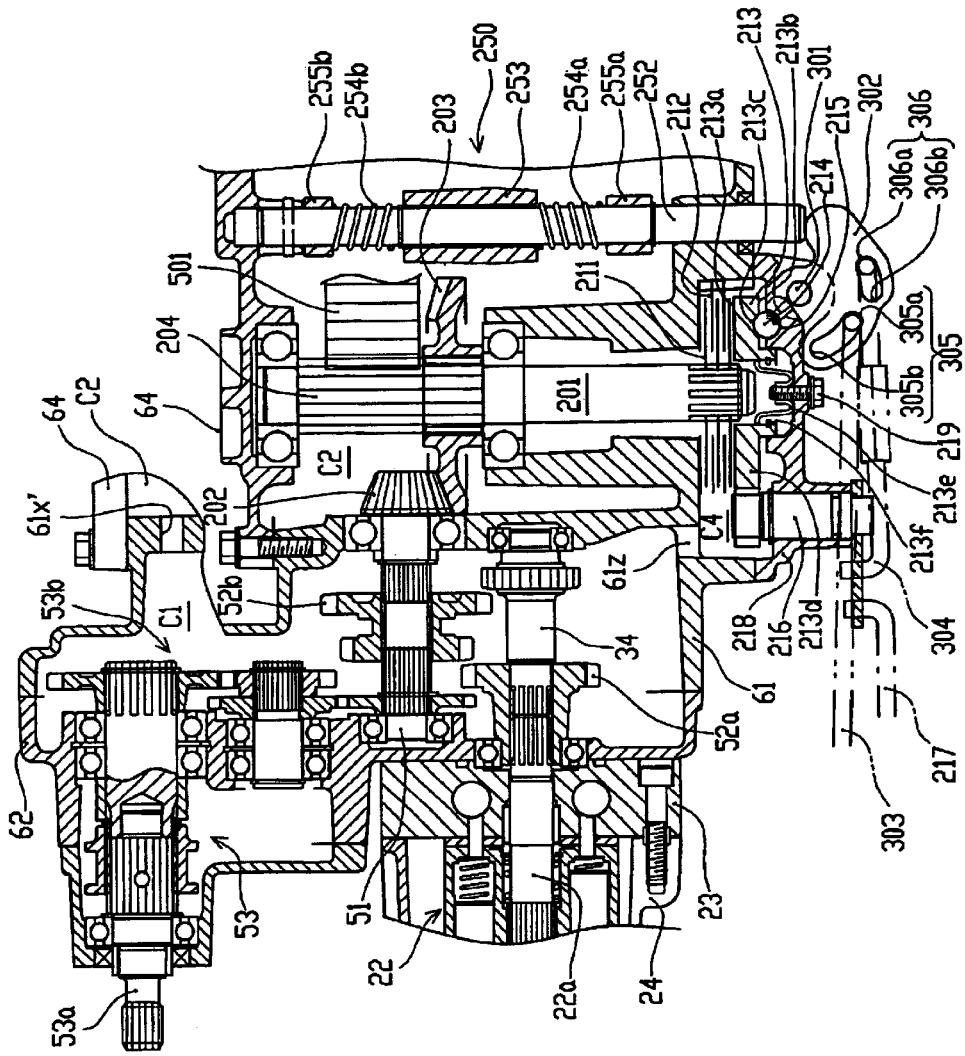
FIG. 8 is a development elevation of a running power drive train of the transmission taken along lines VIII—VIII in FIG. 6.
Figure 9:
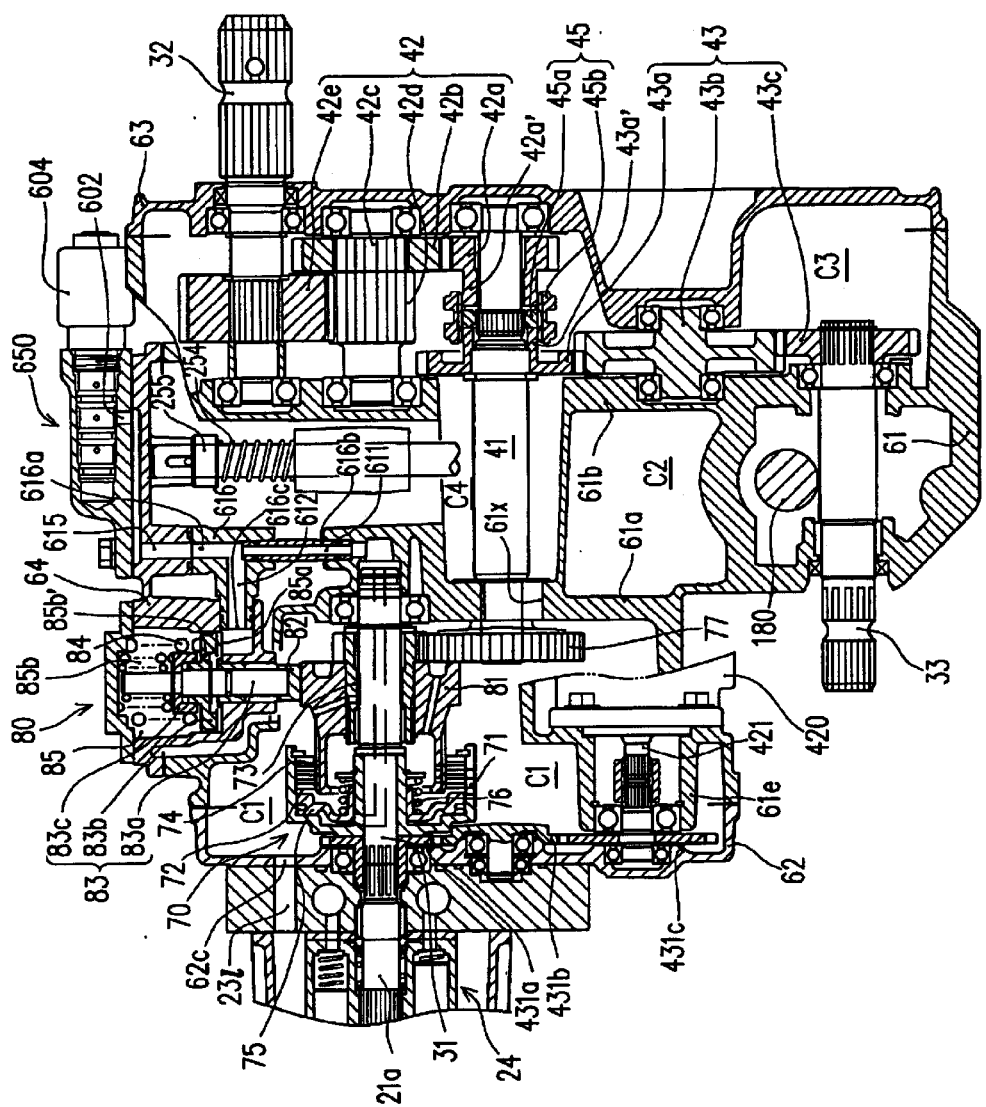
FIG. 9 is a development elevation of a PTO drive train of the transmission taken along lines IX—IX in FIG. 7.

FIGS. 6 and 7 are respectively front and rear views of the transmission with front cover 62 and rear cover 63 of the hereinafter-described transmission case 60 removed. FIG. 8 is a development elevation of a running power drive train of the transmission taken along lines VIII—VIII in FIG. 6. FIG. 9 is a development elevation of a working-vehicle (PTO) drive train of the transmission 30 taken along lines IX—IX in FIG. 7.

As illustrated in FIGS. 3 to 9, the transmission 30 includes working-unit driving power input shaft (PTO input shaft) 31 that is disposed coaxial with the pump shaft 21a and connected therewith in such a manner as to be relatively non-rotatable around the axis, rear PTO shaft 32 for the second working unit, mid-PTO shaft 33 for the first working unit, PTO power transmission mechanism 40 for connecting the PTO input shaft 31 with the rear PTO shaft 32 and the mid-PTO shaft 33, running power input shaft 34 that is disposed coaxial with the motor shaft 22a and connected therewith in such a manner as to be relatively non-rotatable around the axis, running power transmission mechanism 50 for connection between the running power input shaft 34 and ring gear 151 of differential gear unit 150 that differentially drives a pair of driving wheels, and the transmission case 60 for supporting the respective members.

As illustrated in FIGS. 3, 5, 8 and 9, the transmission case 60 includes body 61 that forms front and rear openings along the vehicle lengthwise direction and a lateral opening closer to the first lateral side of the vehicle along the vehicle width direction, the front cover 62 and the rear cover 63 for respectively closing the front and rear openings of the body 61, and side cover 64 for closing the lateral opening of the body 61. The thus arranged transmission case 60 is designed to be capable of storing hydraulic fluid in its inner space.

On the rear side of the transmission case 60 is provided working-unit mounting hitch 480 for vertically movably supporting the second working unit. The working-unit mounting hitch 480 is a three-point link hitch that includes right and left lower links 482 pivotably supported on right and left mounting stays 481 mounted on the rear side of the transmission case 60, lift rods 483 that respectively have front ends pivotably connected with free ends of hereinafter-described lift arms 406 and rear ends pivotably connected with the lower links 482, top links 485 that respectively have front ends pivotably supported on mounting bracket 484 mounted to a rear surface of an upper portion of the rear cover 63 (see FIGS. 2 and 3).

The body 61 has front supporting wall 61a and rear supporting wall 61b respectively closer to the front and rear sides along the vehicle lengthwise direction, as best shown in FIG. 3.

The front supporting wall 61a and the rear supporting wall 61b disposed in sequence along the fore and aft direction of the vehicle divide an inner space of the body 61 into front chamber C1, middle chamber C2 and rear chamber C3. These front, middle and rear chambers C1, C2, C3 are arranged to allow the circulation of hydraulic fluid therethrough.

In this embodiment, intermediate chamber C4 is additionally provided above the middle chamber C2, so that hydraulic fluid is circulated between the front, middle, rear and intermediate chambers C1, C2, C3, C4.

Specifically, fluid communication opening 61x for communication between the front chamber C1 and the intermediate chamber C4 is provided substantially at a vertical center of the front supporting wall. The intermediate chamber C4 opens to the rear chamber C3 through an opening formed in the rear supporting wall 61b. At a vertically lower portion of the rear supporting wall 61b is formed fluid communication opening 61y for communication between the middle chamber C2 and the rear chamber C3 (see FIGS. 3, 7 and 9).

On the lower side of the middle chamber C2 is secured a space for accommodation of a power transmission mechanism for transmitting driving power to the driving axle. Specifically, an input end (inner end) of the driving axle is supported at a portion below the middle chamber C2. In this embodiment, the differential gear unit is provided as the driving power transmission mechanism to the driving axle. Accordingly, a space for accommodation of the differential gear unit is secured on the lower side of the middle chamber C2.

More specifically, as illustrated in FIG. 5, the accommodation space as mentioned above is displaced closer to the first lateral side of the transmission case along the vehicle width direction than the running power input shaft 34, which will be hereinafter described in detail.

In FIG. 6, reference code OL represents a fluid level of hydraulic fluid that has been reserved to a predetermined amount by pouring through a hereinafter-described fluid feeding plug 62d. This fluid level is set to be slightly higher than the height of the fluid communication opening 61x. More specifically, the front, middle, rear and intermediate chambers C1, C2, C3, C4 have the fluid level OL as illustrated before starting the engine. On the contrary, after starting the engine, the fluid level OL of the front chamber C1, to which drain fluid caused by the operation of the HST accompanied is flown, tends to increase, while the fluid level OL of the middle chamber C2 from which reservoir fluid is sucked out by the auxiliary hydraulic pump 420, tends to decrease.

Reference code 61x' in FIGS. 6 and 8 represents a fluid communication opening formed on the lower side of the front supporting wall 61a for communication between a lower portion of the front chamber C1 and the middle chamber C2. The fluid communication opening 61x' is not designed to allow positive fluid flow from the front chamber C1 to the middle chamber C2, but to prevent hydraulic fluid from staying in the front chamber C1 when hydraulic fluid is removed from the transmission case. Therefore, the fluid communication opening 61x' has a minimized size.

The front supporting wall 61a is designed to support the rear ends of the PTO input shaft 31 and the running power input shaft 34 substantially at the widthwise center of the transmission case 60. Specifically, both the PTO input shaft 31 and the running power input shaft 34 are supported by the front cover 62 and the front supporting wall 61a along substantially the widthwise center line of the transmission case in vertically spaced and parallel relationship.

More specifically, as best illustrated in FIGS. 2, 3 and 6, the PTO input shaft 31 has a front end supported by the front cover 62 in such a manner as to be connectable with the pump shaft and a rear end supported by the front supporting wall 61a, so that the rotational axis of the PTO input shaft 31 extends along the vehicle lengthwise direction at substantially the widthwise center of the transmission case 60.

On the other hand, the running power input shaft 34 has a front end supported by the front cover 62 in such a manner as to be connectable with the motor shaft, and a rear end supported by the front supporting wall 61a, so that the rotational axis of the running power input shaft 34 extends along the vehicle lengthwise direction at the widthwise center of the transmission case 60 on the lower side of the PTO input shaft 31.

The rear supporting wall 61b is designed to support a front end of the rear PTO shaft 32. Specifically, the rear PTO shaft 32 is supported by the rear supporting wall 61b and the rear cover 63. More specifically, the rear PTO shaft 32 is supported by the rear supporting wall 61b and the rear cover 63 so that the rotational axis of the rear PTO shaft 32 extends along the vehicle lengthwise direction and has a rear end protruding rearwards through the rear cover 63.

The front cover 62 is connected with the body 61 so as to cover the front opening of the body 61 and support the center section 23. That is, the center section 23 is connected with the front cover as supporting the hydraulic pump body 21 and the hydraulic motor body 22.

In this embodiment, the front cover 62 is provided to close the front opening of the body 61. Alternatively, the center section 23 may be designed to close the front opening of the body 61.

The mid-PTO shaft 33 acts as a driving shaft of the first working unit 112 such as a mower unit disposed below the lengthwise center of the chassis 101. Therefore, the mid-PTO shaft 33 is supported by the front supporting wall 61a and the rear supporting wall 61b within the transmission case 60 closer to the lower side thereof in such a manner as to have a rotational axis extending in the vehicle lengthwise direction and a front end protruding forwards through the transmission case 60.

Input shaft 112 of the first working unit 112 operatively connected with the mid-PTO shaft 33 (see FIG. 1) is preferably displaced from the widthwise center of the vehicle to the first or second lateral side along the vehicle width direction so as to minimize increase of the vehicle height and prevent interference with the chassis 101. In this embodiment, as described above, the differential gear unit 150 is accommodated within the transmission case 60 closer to the first lateral side and lower side thereof. Accordingly, it is preferable to displace along the vehicle width direction the input shaft 112 of the first working unit 112 to the second lateral side, which is opposite to the first lateral side with the differential gear unit 150 displaced thereto, while displacing the mid-PTO shaft 33 to the second lateral side. With this arrangement, it is possible to limit increase of the vehicle height and prevent interference with the differential gear unit 150, as well as simplifying the power transmission mechanism for connection between the mid-PTO shaft 33 and the input shaft 112 of the first working unit 112.

In this embodiment, as illustrated in FIG. 3, for positioning the mid-PTO shaft 33 as close as possible to a ground, the mid-PTO shaft 33 is located on the lower side of a pair of the driving axles 180. This arrangement enables a simplified structure of the power transmission for connection between the mid-PTO shaft 33 and the first working unit 112.

That is, the first working unit 112 is designed to take an operation position where it is placed on the ground and a standby position where it has been elevated from the ground. For achieving these positions, the first working unit 112 is connected with the mid-PTO shaft 33 via the power transmission mechanism equipped with universal joints. In this case, if the mid-PTO shaft 33 is located as close as possible to the ground, a bending angle of the universal joints to the PTO shaft 33 when the first working unit 112 has been brought into the operational position can be minimized, thereby achieving a simplified structure of the power transmission mechanism with the universal joints.

In FIG. 1, reference code 112' represents a front PTO unit. In this embodiment, the front PTO unit 112' is detachably hooked on a bottom surface of the front axle 10e. The front PTO unit 112' is used for a working unit such as a snow removing unit to be mounted on the front side of the vehicle, as an alternative to the arrangement with the first working unit 112 such as the mower mounted on the lower side of the vehicle as mentioned above. Specifically, the front PTO shaft, which extends along the vehicle lengthwise direction, has a rear end connected with the mid-PTO shaft 33 via a shaft coupling, and a front end connected with a driving part of the working unit via a shaft coupling.

The PTO power transmission mechanism 40 includes, as best shown in FIGS. 3, 6, 7 and 9, PTO power transmission shaft 41 extends along the vehicle lengthwise direction and is supported within the transmission case 60 as straddling between the intermediate chamber C4 and the rear chamber C3, PTO clutch unit 70 for switching on/off power transmission from the PTO input shaft 31 to the PTO power transmission shaft 41, PTO gear train 42 for connection between the PTO power transmission shaft 41 and the rear PTO shaft 32, mid-PTO power transmission gear train 43 for connection between the PTO power transmission shaft 41 and the mid-PTO shaft 33, and switching unit 45 for switching on/off power transmission from the PTO power transmission shaft 41 to the rear PTO gear train 42 and/or the mid-PTO power transmission gear train 43.

The PTO power transmission shaft 41 is, as best illustrated in FIGS. 6 and 9, supported by the front supporting wall 61a and the rear cover 63 in such a manner as to have a rotational axis extending along the vehicle lengthwise direction and located closer to the second lateral side of the transmission case 60 than the PTO input shaft 31, which side is the opposite side to the first lateral side with the differential gear unit accommodation space displaced thereto, and a rear end reaching the rear side of the transmission case 60.

The PTO power transmission shaft 41 acts as a driving shaft for the mid-PTO shaft 33 and the rear PTO shaft 32. As described above, the mid-PTO shaft 33 is located within the transmission case 60 closer to the lower side thereof, while the rear PTO shaft 32 is located within the transmission case 60 closer to the upper side thereof. Accordingly, in this embodiment, as illustrated in FIG. 6, the PTO power transmission shaft 41 is located lower than the PTO input shaft 31, so that driving power from the PTO power transmission shaft 41 to both the mid-PTO shaft 33 and the rear PTO shaft 32 can be efficiently transmitted with a relatively simple arrangement.

As illustrated in FIG. 9, the PTO clutch unit 70 is located within the front chamber C1 of the transmission case 60. That is, in this embodiment, the switching on/off driving power to be transmitted from the PTO input shaft 31 to the PTO power transmission shaft 41 is made within the transmission case 60 closer to the front side thereof.

Specifically, the PTO clutch unit 70 includes driving-side member 71 relatively non-rotatably and axially non-slidably supported on the PTO input shaft 31, driving-side friction plate 72 supported on the driving-side member 71, driven-side member 73 relatively rotatably supported on the PTO input shaft 31, driven-side friction plate 74 relatively non-rotatably and axially slidably supported on the driven-side member 73, clutch pressing member 75 for bringing the driven-side friction plate 74 into frictional engagement with the driving-side friction plate 72 upon receiving hydraulic pressure, clutch biasing member 76 for moving the clutch pressing member 75 away from the driving-side friction plate 72 and the driven-side friction plate 74, and PTO power transmission gear 77 relatively non-rotatably supported on a front end of the PTO power transmission shaft 41 in meshed engagement with the driven-side member 73.

The PTO clutch unit 70 of the above arrangement acts as a main PTO gear train for transmitting driving power from the PTO input shaft 31 to the PTO power transmission shaft 41 via the driven-side member 73 where the clutch pressing member 75 has brought both the friction plates 72, 74 into frictional engagement with each other upon receiving hydraulic pressure, and acts as a shut-off member for shutting off the power transmission from the PTO input shaft 31 to the driven-side member 73 where it is not subjected to hydraulic pressure.

In this embodiment, the PTO clutch unit 70 further includes PTO brake mechanism 80 that is operable in association with clutching motion of the PTO clutch unit 70. Accordingly, this PTO brake mechanism 80 effectively prevents free rotation of the rear PTO shaft 32 and the mid-PTO shaft 33 due to inertia force of the connected working unit in the wake of shutting off the power by the PTO clutch unit 70.

The PTO brake mechanism 80 includes brake disc 81 relatively non-rotatably mounted on the driven-side member 73 (i.e., an outer periphery of the driven-side member 73 in this embodiment), brake shoe 82 located so as to be frictionally engageable with the brake disc 81, brake pressing member 83 having a distal end supporting the brake shoe 82 and a proximal end axially sidably supported on cylinder chamber 85 formed in the transmission case 60, and brake biasing member 84 for biasing the brake pressing member 83 so as to bring the brake shoe 82 into frictional engagement with the brake disc 81. With this arrangement, where the brake pressing member 83 is not subjected to hydraulic pressure, the brake shoe 82 is brought into frictional engagement with the brake disc 81 upon receiving biasing force effected by the brake biasing member 84, thereby applying braking force to the brake disc 81. On the other hand, where the brake pressing member 83 is subjected to hydraulic pressure, the brake pressing member 83 is moved in a direction away from the brake shoe 82 against the biasing force of the brake biasing member 84, thereby applying no braking force to the brake disc 81.

More preferably, the cylinder chamber 85 is formed in the side cover 64. The reason for forming the cylinder chamber 85, which must be tightly sealed, not in the body 61 but the side cover 64 is that there will be no need to form the body 61 with an increased precision and therefore the body 61 can be relatively easily formed by casting.

Operations of applying hydraulic pressure to the brake pressing member 83 and the clutch pressing member 75 respectively are associated with each other. That is, where the clutch unit 70 is brought into the ON state by the application of hydraulic pressure to the clutch pressing member 75, hydraulic pressure is also applied to the brake pressing member 83, thereby bringing the brake mechanism 80 into the OFF state. On the other hand, where the clutch unit 70 is brought into the OFF state by the application of no hydraulic pressure to the clutch pressing member 75, hydraulic pressure is also not applied to the brake pressing member 83, thereby bringing the brake mechanism 80 into the ON state. That is, the hydraulic brake mechanism 80 and the hydraulic clutch unit 70 are controlled by a common hydraulic source so as to be operated in association with each other.

In this embodiment, PTO line 602, which receives pressurized fluid from the hereinafter described auxiliary hydraulic pump 420, is used as the common hydraulic source for the hydraulic brake mechanism 80 and the hydraulic clutch unit 70. More specifically, valve assembly 650, which is equipped with switch valve 604 for controlling feeding of working fluid from the PTO line 620 to the hydraulic brake mechanism 80 and the hydraulic clutch unit 70, is fixedly attached on an outer surface of the side cover 64.

On the inner surface of the side cover 64 is provided a pressurized-fluid distributor for distributing pressurized fluid of the PTO line 602 into the hydraulic brake mechanism 80 and the hydraulic clutch unit 70.

In this embodiment, the side cover 64 forms therein hole 615 having an outer end communicated with the PTO line 602 and an inner end opening through an inner surface of the side cover 64. Also, as the pressurized-fluid distributor, there is provided manifold 616 having first end 616a communicated with the inner end of the hole 615 and second end in the form of first and second open ends 616b, 616c respectively facing the clutch pressing member 75 and the brake pressing member 83. The first open end 616b and the second open end 616c respectively constitute hereinafter-described clutch line 611 and brake line 612.

In this embodiment, as illustrated in FIG. 3, the first open end 616b faces in the vehicle width direction, and the second open end 616c faces in the vehicle lengthwise direction. Preferably, at least one of the first open end 616b and the second open end 616c may be formed by a pipe or any other separable members, thereby achieving improved workability and fabricability of the manifold.

Figure 13:
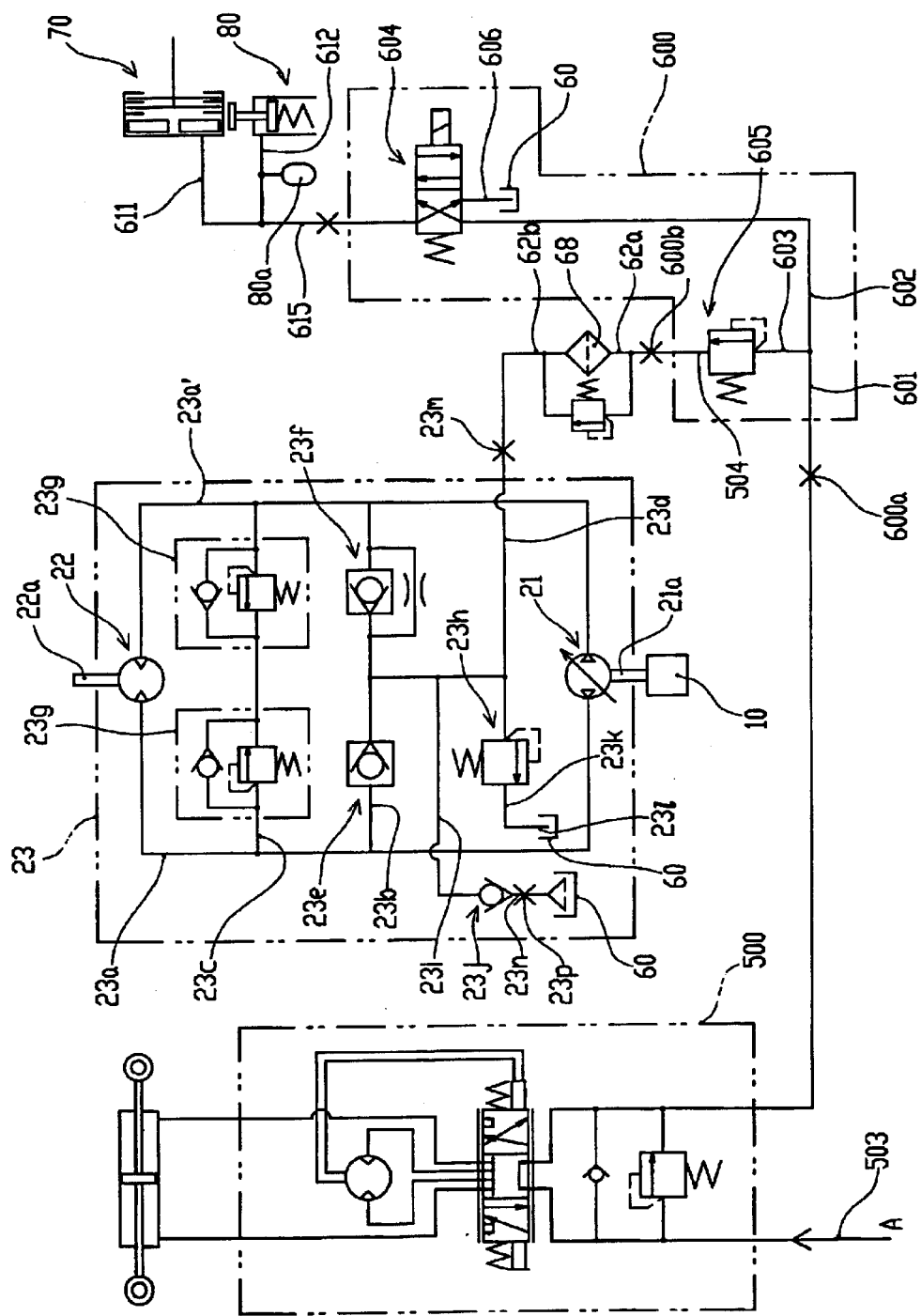
FIG. 13 is a hydraulic circuit diagram of a center section and a PTO clutch unit.

In this embodiment, the brake mechanism 80 is provided with accumulator mechanism 80a for absorbing shift shocks caused by shifting the PTO clutch unit 70 from the power shut-off state to the power transmission state (see FIG. 13).

Specifically, the brake pressing member 83 includes rod 83a having a proximal end positioned within the cylinder chamber 85 and a distal end with the brake shoe 82 mounted thereon, pressure receiving plate 83b that is axially slidably supported on the rod 83a so as to drive the cylinder chamber 85 into pressurized-fluid operation chamber 85a and biasing-member accommodation chamber 85b, and driven plate 83c axially non-movably supported on the rod 83a so as to be positioned within the biasing-member accommodation chamber 85b.

The pressure receiving member 83b forms therein orifice 85b' for communication between the pressurized-fluid operation chamber 85a and the biasing-member accommodation chamber 85b. The orifice 85b' is adapted to be closed by the driven plate 83c when the pressure receiving plate 85b is pressed towards the biasing-member accommodation chamber 85b by a predetermined stroke upon receiving hydraulic pressure.

The PTO brake mechanism 80 having the above arrangement is operated in the manner as described below.

When pressurized fluid is fed through the PTO line 602, hydraulic pressures in the clutch line 611 and the brake line 612 increase, which causes pressurized fluid to leak out through the orifice 85b'. Accordingly, the hydraulic pressures in the clutch line 611 and the brake line 612 gradually increase at the initial stage, so that the hydraulic clutch unit 70 is gradually brought into the engaged state. Then, the pressure receiving plate 85b is pressed by pressurized fluid, and then the orifice 85b' is closed. Hence, the hydraulic pressures in the clutch line 611 and the brake line 612 increase to predetermined values.

Thus, in this embodiment, the hydraulic pressure in the clutch line 611 can be gradually increased until the orifice 85b' is closed by the pressure receiving plate 85b that has been pressed by a predetermined stroke. Therefore, it is possible to prevent abrupt engagement of the hydraulic clutch unit 70 and hence effectively prevent wear-out/damages of the respective members.

As illustrated in FIG. 9, the rear PTO gear train 42 is accommodated within the rear chamber C3 of the transmission case 60. More specifically, the rear PTO gear train 42 includes rear-PTO gear member 42a relatively rotatably supported on a portion of the PTO power transmission shaft 41 in proximity to the rear end thereof, idle gear 42b meshed with the gear member 42a, intermediate shaft 42c relatively non-rotatably supporting the idle gear 42b, and final gear 42e relatively non-rotatably supported on the rear PTO shaft 32 in proximity to the front end thereof so as to be meshed with spline 42d provided on the intermediate shaft 42c.

As best illustrated in FIG. 9, the mid-PTO power transmission gear train 43 is located on the rear side of the pair of driving axles 180. That is, the mid-PTO power transmission gear train 43 is arranged within the rear chamber C3 so as to be located on the rear side of the differential gear unit 150, thereby preventing interference with the differential gear unit 150 located lower than the middle chamber C2 within the transmission case 60.

Specifically, the mid-PTO power transmission gear train 43 includes mid-PTO gear member 43a relatively rotatably supported on the PTO power transmission shaft 41 with facing the rear-PTO gear member 42a, idle gear 43b meshed with the gear member 43a, and final gear 43c relatively non-rotatably supported on a rear end of the mid-PTO shaft 33 in meshed engagement with the idle gear 43b.

The switching unit 45 is so designed as to be capable of transmitting rotational force of the PTO power transmission shaft 41 to the rear-PTO gear member 42a and/or the mid-PTO gear member 43a by the external operation.

Specifically, the rear-PTO gear member 42a and the mid-PTO gear member 43a respectively have engagement elements 42a', 43a' disposed in a face-to-face relationship with each other. The switching unit 45 includes spline hub 45a relatively non-rotatably supported on the PTO power transmission shaft 41 so as to be positioned between the engagement elements 42a', 43a' of the rear PTO gear member 42a and the mid-PTO gear member 43a, clutch shifter 45b axially slidably and relatively non-rotatably fitted on the spline hub 45a as straddling the spline hub 45a and the engagement element 42a' of the rear-PTO gear member 42a and/or the engagement element 43a' of the mid-PTO gear member 43a, and arm 45c (see FIG. 7) for operating the clutch shifter 45b.

As described above, the clutch shifter 45b is relatively non-rotatably and axially movably fitted on the spline hub 45a and the engagement elements 42a', 43a' of the rear PTO gear member and the mid-PTO gear member. The thus arranged clutch shifter 45b is designed to be capable of selectively taking a rear-PTO output position enabling the spline hub 45a to be relatively non-rotatably connected with the rear-PTO gear member 42a according to its axial position, a mid-PTO output position enabling the spline hub 45a to be relatively non-rotatably connected with the mid-PTO gear member 43a, and a rear- and mid-PTO output position enabling the spline hub 45a to be relatively non-rotatably connected with both the rear PTO gear member 42a and the mid-PTO gear member 43a.

As best illustrated in FIGS. 3, 5, 6 and 8, the running power transmission mechanism 50 includes speed-change shaft (running power transmission shaft) 51 supported within the transmission case 60 so as to be located closer to the first lateral side of the transmission case 60 than the running power input shaft 34 in a laterally adjacent relationship with each other along the vehicle width direction and have a rotational axis extending along the vehicle lengthwise direction, mechanical transmission unit 52 for transmitting/shutting off the power with its speed stepwisely changed between the running power input shaft 34 and the running power transmission shaft 51, optional front-wheel-driving-power-take-off unit 53, and travelling brake unit 200 interposed between the speed-change shaft 51 and ring gear 151 of the differential gear unit 150.

The running power transmission shaft 51 is located on the front side of the differential gear unit 150 located closer to the first lateral side of the transmission case 60. That is, the running power transmission shaft 51 is located closer to the first lateral side of the transmission case 60 than the running power input shaft 34, which is located substantially at the widthwise center of the transmission case 60, in which the first lateral side is the same side as the side to which the differential gear unit 150 is displaced.

The mechanical transmission unit 52 includes driving-side gear 52a relatively non-rotatably supported on the running power input shaft 34, driven-side member 52b having plural driven-side gears (two in this embodiment) selectively capable of meshing with the driving-side gear 52a and relatively non-rotatably and axially slidably supported on the speed-change shaft 51, and an operation member (not shown) for moving the driven-side member 52b in the axial direction of the speed-change shaft 51. With this arrangement, by bringing one of the driven-side gears into meshing engagement with the driving-side gear 52a, the driving power with its speed changed can be transmitted from the running power input shaft 34 to the running power transmission shaft 51.

The front-wheel-driving-power-take-off unit 53 is located within the transmission case 60 closer to the front side thereof, and first lateral side and lower side of the transmission case 60 with reference to the running power transmission shaft 51. That is, the front-wheel-driving-power-take-off unit 53 is located in the transmission case 60 closer to the front side, and first lateral side and lower side of the transmission case 60 than the running power input shaft 34 and the running power transmission shaft 51 are.

Specifically, the front-wheel-driving-power-take-off unit 53 includes front-wheel-driving-power-take-off shaft 53a supported at a position closer to the first lateral side and lower side of the transmission case 60 so as to have a front end extending forwards through the transmission case 60, and gear train 53b with a clutch for connection between the running power transmission shaft 51 and the front-wheel-driving-power-take-off shaft 53a.

The travelling brake unit 200 is designed to be operable by a single brake pedal 205 (see FIG. 1) located on a left step provided on the chassis 101. Specifically, as illustrated in FIGS. 3, 5 and 8, the travelling brake unit 200 includes brake shaft 201 supported within the transmission case 60 so as to extend along the vehicle width direction, driving-side bevel gear 202 relatively non-rotatably supported on a rear end of the speed-change shaft 51, driven-side bevel gear 203 relatively non-rotatably supported on the brake shaft 201 in meshed engagement with the driving-side bevel gear 202, output gear 204 provided on the brake shaft 201 in meshed engagement with the ring gear 151, and brake mechanism 210 for stopping rotation of the brake shaft 201 based upon the external operation.

As illustrated in FIG. 8, the brake mechanism 210 includes brake cover 218 that is connected with a side surface of the body 61 of the transmission case 60, which side is closer to the second lateral side thereof, and that defines the intermediate chamber C4 on the upper side of the middle chamber C2 in cooperation with the body 61, driving-side friction plate 211 relatively non-rotatably and axially slidably supported on the brake shaft 201, driven-side friction plate 212 relatively non-rotatably supported within the transmission case 60 in a face-to-face relationship with the driving-side friction plate 211, ring-shaped pressing member 213 that has pressing surface 213a facing the driving-side friction plate 211 and supported axially movably on the brake shaft 201 and relatively rotatably around the axis of the brake shaft 201, slanting cam groove 213c formed in rear surface 213b opposite to the pressing surface 213a of the pressing member 213 in such a manner as to be gradually thickened as it advances towards a first side along a peripheral direction of the pressing member 231, ball 214 located within the slanting cam groove 213c, ball-holding recess 215 formed on an inner surface of the brake cover 218, which surface facing the rear surface 213b of the pressing member 213, for fixedly holding the ball 214, connection arm 216 that has an inner end connected with the pressing member 213 via a cam and an outer end relatively rotatably supported on the brake cover 218 as extending to the outside of the transmission case 60 and that is adapted to rotate the pressing member 213 in the peripheral direction by its rotation on its axis, and operation member 217 for connection between the outer end of the connection arm 216 and the brake pedal 205 (see FIG. 1) and rotation of the connection arm 216 around its axis based upon the operation of the brake pedal 205.

The thus arranged brake mechanism 210 is so operated that the ball 214 presses the pressing member 212 towards the brake shaft 201 by rotating the pressing member 213 to the first side along the peripheral direction thereof through the operation of the operation member 217, thereby bringing the driving-side friction plate 211 into frictional engagement with the driven-side friction plate 212 to stop the rotation of the brake shaft 201.

Preferably, the pressing member 213 is connected with the brake cover 218 in such a manner as to be capable of moving towards the brake cover 218 by a braking stroke, while holding the ball 214 in its space to the brake cover 218.

Specifically, the pressing member 213 includes plate body 213d forming therein a center hole extending in the axial direction of the brake shaft 201, and connection member 213e of a substantially cylindrical shape fitted within the center hole in elastic engagement with the plate body 213d.

The connection member 213e has a proximal end formed with a radially outwardly extending flange portion and a distal end formed with an inwardly threaded portion. The thus formed connection member 213e is fitted within the center hole of the plate body 213d with the flange portion radially inwardly compressed, enabling the connection member 213e to be elastically connected with the plate body 213d by a resilient force of the flange portion.

The connection member 213e of the above arrangement is connected with the brake cover 218 via threaded member 219, thereby enabling the plate body 213d to move towards the brake cover 218 in the axial direction of the brake shaft 201.

Around an inner periphery of the center hole of the plate body 213d and closer to a rear side of the same is provided stopper piece 213f in spaced apart relationship with an abutting portion of the plate body 213d against the flange portion of the connection member 213e. The stopper piece 213f defines a movable range of the plate body 213d to the brake cover 218. That is, the distance between an abutting point of the flange portion within the center hole and the stopper piece 213f corresponds to the braking stroke.

According to the above arrangement, the brake cover 218 can be incorporated into the body 61 of the transmission case 60 with the pressing member 213 and the brake cover 218 connected to each other with the ball 214 held therebetween. Therefore, it is possible to achieve an improved efficiency in assembling the brake mechanism 210, while producing a sufficient braking capability by the brake mechanism 210.

The running power transmission mechanism 50 is provided with differential-locking mechanism 250 for locking the differential gear unit 150. The differential-locking mechanism 250 is designed to be capable of forcibly locking rotation of bevel gears 154 about pivotal shaft 153. These bevel gears 154 move around the pair of the driving axles 180 in association with the rotation of the ring gear 151 and are relatively rotatably supported by the pivotal shaft 153 in meshed engagement with a pair of side bevel gears 152, which are respectively and relatively non-rotatably supported on the pair of the driving axles 180 (see FIG. 5).

Specifically, as illustrated in FIGS. 5 and 8, the differential-locking mechanism 250 includes locking member 251 that is designed to be capable of taking a locking position enabling the ring gear 151 to be relatively non-rotatably engaged with one of the pair of the side bevel gears 152 and a releasing position enabling the ring gear 151 to be released from the relatively non-rotatable engagement with the one of the pair of the side bevel gears 152, differential-locking fork shaft 252 that is axially movably supported to the transmission case 60 with its axis extending along the vehicle width direction and is capable of moving along its axis based upon the operation from the outside of the transmission case 60, differential-locking fork 253 that has a proximal end axially slidably supported on the differential-locking shaft 252 and a distal end engaged with the locking member 251, a pair of first and second return springs 254a, 254b supported on the differential-locking fork shaft 252 with the proximal end of the differential-locking fork 253 therebetween, first stopper member 255a fitted around the differential-locking fork shaft 252 in abutting engagement with an outer end of the first return spring 254a and is capable of moving along with the differential-locking fork shaft 252 when it moves to one side along the axis (locking direction), and second stopper member 255b that has an inner end disposed in abutting engagement with an outer end of the second return spring 254b and an outer end fitted around the differential-locking fork shaft 252 in abutting engagement with the inner surface of the side cover 64 and is capable of relatively moving the differential-locking fork shaft 252 along the axis.

The differential-locking mechanism 250 of the above arrangement is operated in the following manner.

By moving the differential-locking fork shaft 252 to the first side along the axis, the first stopper member 255a compresses the first return spring 254a. The differential-locking fork 253 then moves as compressing the second return spring 254b upon receiving the elastic force of the first return spring 254a, thereby moving the locking member 251 into the locking position.

Then, by releasing the operational force from the differential-locking shaft 252, the differential-locking fork 253 and the differential-locking fork shaft 252 return to a second side along the axis (releasing direction) by the biasing force of the second return spring 254b, thereby moving the locking member 251 into the releasing position.

Thus, the differential-locking mechanism 250 is so operated as to lock the differential gear unit 150 upon the application of the operational force to the differential-locking fork shaft 252, and automatically release the differential gear unit 150 from the locked state upon releasing the operational force.

The running power transmission mechanism 50 also includes link mechanism 300 for simultaneously stopping both the pair of the driving axles 180 upon the operation of the travelling brake unit 200. That is, as described above, the travelling brake unit 200 is designed to apply a braking force to the brake shaft 201 located on the upstream side of the differential gear unit. Accordingly, where the brake mechanism 200 is operated without locking the differential gear unit 150, there may cause time difference in stopping the pair of the driving axles 180 due to difference in loads respectively applied to the pair of the driving axles 180. This time difference indicates the fact that one driving wheel keeps on rotating while another driving wheel stops its rotation, thereby causing the vehicle to slide sideways when it is stopped. Therefore, the differential gear unit 150 must be locked when the travelling brake unit 200 is operated.

On the other hand, where one of the pair of the driving wheels slips in the mud or the like, the differential gear unit 150 must be locked so as to transmit a sufficient power to another driving wheel. To overcome this situation, only the differential-locking mechanism 250 must be operated (locked) without operating the travelling brake unit 200 as a matter of course.

The link mechanism 300 is provided for meeting the above demand, and therefore designed to be capable of solely operating (locking) the differential-locking mechanism 250 as forcibly operating (locking) the differential-locking mechanism 250 at the time of operation of the travelling brake unit 200.

Specifically, as illustrated in FIG. 8, the link mechanism 300 includes pivoting member 302 that is pivotably supported on pivot shaft 301 so as to move the differential-locking fork shaft 252 along the axis, differential-locking operation member 303 that has a distal end directly or indirectly connected with the pivoting member 302, and elongated connection member 304 that has a distal end engaged with the pivoting member 302 and a proximal end engaged with the connection arm 216 of the travelling brake unit 200, and moves towards the pivoting member 302 in association with the rotation of the connection arm 216 in such a direction as to actuate the travelling brake unit 200.

The pivoting member 302 forms therein first and second elongated holes 305, 306 extending along a pivoting direction of the pivoting member 302. Distal ends of the differential-locking operation member 303 and the connection member 304 are respectively held within the first and second elongated holes 305, 306.

The first elongated hole 305 extends between first end 305a closer to a first side of the pivoting direction of the pivoting member 302 and second end 305b closer to a second side of the pivoting direction, in which the distal end of the connection member 304 engages the first end 305a enabling the pivoting member 302 to press the differential-locking fork shaft 252, while the distal end of the connection member 304 engages the second end 305b enabling the pivoting member to move away from the differential-locking fork shaft 252. Similarly, the second elongated hole 306 extends between first end 306a and second end 306b respectively closer to the first and second sides of the pivoting direction of the pivoting member 302.

Figure 10:
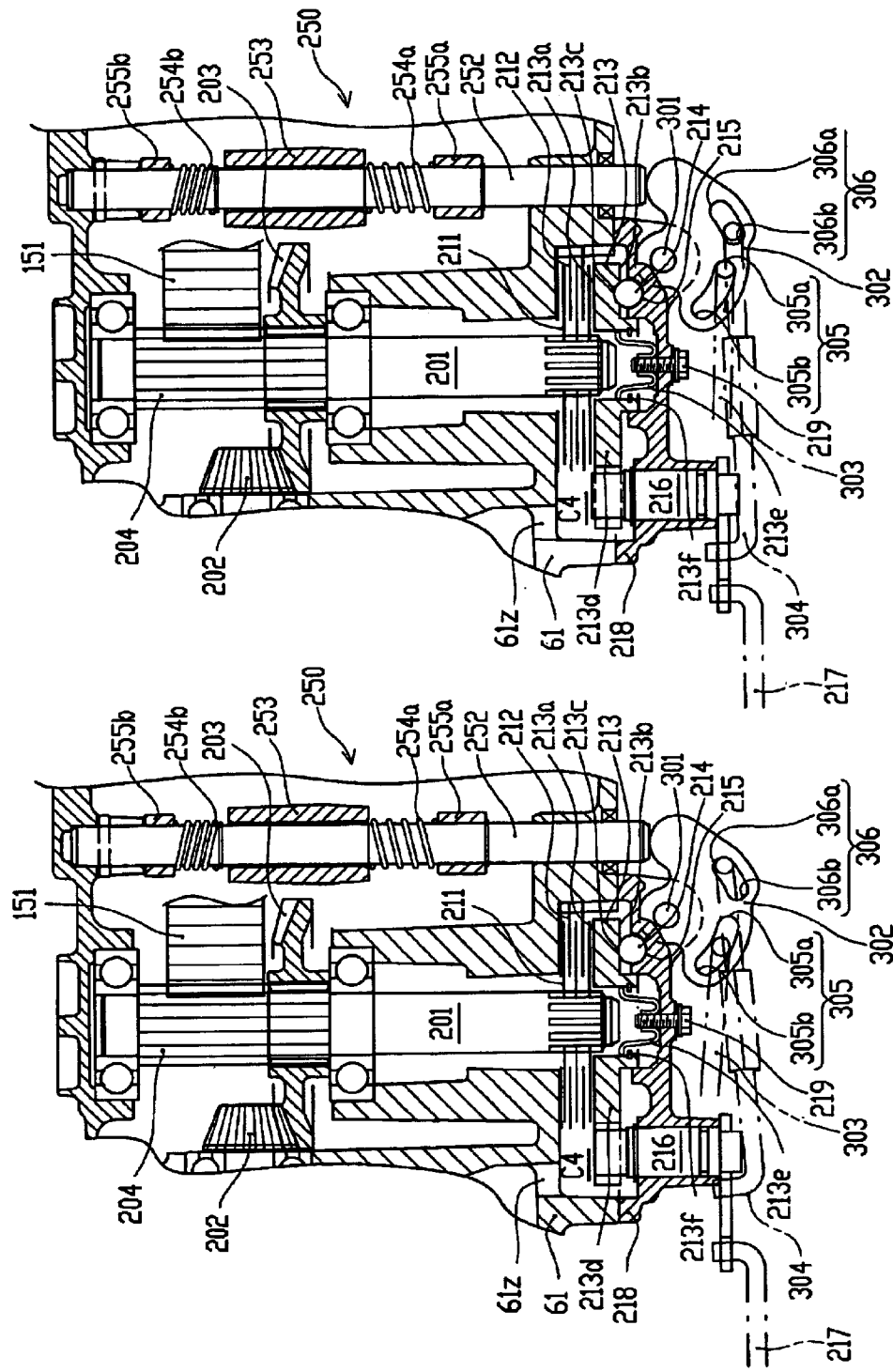
FIG. 10 are partially cross-sectioned plan views of a peripheral portion of a brake shaft in the transmission. Specifically, FIGS. 10(a) and 10(b) respectively illustrate states with a differential-locking mechanism actuated in association with an actuated running brake unit and separately and independently actuated.

FIG. 10 are partially cross-sectioned plan views of a peripheral portion of the brake shaft in the transmission. Specifically, FIGS. 10(a) and 10(b) respectively illustrate a state where the travelling brake unit 200 is in an operative position and a state where only the differential locking unit is in an operative position.

As illustrated in FIG. 8, where both the travelling brake unit 200 and the differential-locking mechanism 250 are out of the operation, the distal ends of the differential-locking operation member 303 and the elongated connection member 304 are positioned at the first ends 305a, 306a of the first and second elongated holes 305, 306 closer to the first side of the pivoting direction. Once the travelling brake unit 200 is actuated in this state, the connection member 304 is moved towards the pivoting member 302, thereby pivoting the pivoting member 302 towards the first side of the pivoting direction. Accordingly, the differential fork shaft 252 is pressed by the pivoting member 302 (see FIG. 10(a)).

On the other hand, where only the differential-locking mechanism 250 is operated in a state as illustrated in FIG. 8, the pivoting member 302 is pivoted towards the first side of the pivoting direction by the differential-locking operation member 303, thereby moving the differential-locking fork shaft 252, as illustrated in FIG. 10(b), while not moving the connection member 304. That is, although the pivoting member 302 is pivoted towards the first side of the pivoting direction, the connection member 304 is not moved by the interference of the second elongated hole 306.

Thus, the link mechanism 300 is designed to be capable of forcibly locking the differential-locking mechanism 250 in association with the operation of the travelling brake unit 200, while allowing only the differential-locking mechanism 250 to be actuated.

The transmission 30 having the above arrangement can produce the following desirable effects in addition to those described above.

That is, the PTO input shaft 31 and the running power input shaft 34 are aligned in vertically spaced apart relationship with each other at substantially the widthwise center of the transmission case 60, while the PTO power transmission mechanism 40 following a downstream side of the PTO input shaft 31 is located only in a space of the transmission case 60 closer to the second lateral side thereof than the PTO input shaft 31 is, and the running power transmission mechanism 50 following a downstream side of the running power input shaft 34 is located only in a space of the transmission case 60 closer to the first lateral side and lower side of the transmission case 60 than the running power input shaft 34 is. As a result, it is possible to effectively shorten the length along the vehicle lengthwise direction of the transmission case 60 and vertical length of the same, while assigning a space above the running power transmission mechanism 50 as an accommodation space for other members. This accommodation space can be used for example for accommodating cylinder tube 401 of hydraulic lift unit 400 (hereinafter described) or the like.

Also, the transmission of the driving power from the PTO power transmission shaft 41 to the mid-PTO shaft 33 is achieved through the mid-PTO power transmission gear train 43 located on the rear side of the differential gear unit 150. Therefore, an end position (position at which the driving power is taken off) can be positioned as close as possible to the pair of the driving axles 180. This close positioning of the end position of the mid-PTO shaft 33 to the pair of the driving axles 180 in turn achieves a broader distance between the end of the mid-PTO shaft 33 and the first working unit 112 driven by the mid-PTO shaft 33, and hence achieves a smaller bending angle of the universal joint of the transmission mechanism with respect to the mid-PTO shaft 33, which mechanism connecting between the first working unit 112 and the mid-PTO shaft 33, with the first working unit 112 elevated. Therefore, it is possible to smoothly move the first working unit 112 in a vertical direction, and achieve a desirable result such as reduced noises and improved durability.

In the transmission 30, the PTO power transmission shaft 41 is displaced to the second lateral side of the transmission case 60, as described above. Also, the mid-PTO shaft 33 is displaced to the second lateral side of the transmission case 60. Accordingly, a straight distance between the PTO power transmission shaft 41 and the mid-PTO shaft 33 can be minimized. Also, the arrangement, where the running power transmission mechanism 50 is located on the front side of the transmission case 60 along the vehicle lengthwise direction, and the mid-PTO power transmission gear train 43 for connection between the PTO power transmission shaft 41 and the mid-PTO shaft 33 is located on the rear side of the transmission case 60, enables the mid-PTO power transmission gear train 43 to be located along an imaginary straight line between the PTO power transmission shaft 41 and the mid-PTO shaft 33. Such a linear arrangement enables the mid-PTO power transmission gear train 43 to be greatly reduced in size and simplified in structure.

Also, in the transmission 30, the rear PTO gear train 42, which transmits the driving power from the PTO power transmission shaft 41 to the rear PTO shaft 32, is provided with the idle gear 42b and the intermediate shaft 42c, and these members are located closer to the first lateral side than the PTO power transmission shaft 41 along the vehicle width direction. Whereby, it is possible to transmit the driving power with its speed reduced, from the PTO power transmission shaft 41 to the rear PTO shaft 32, while effectively limiting the size of the transmission case 60.

That is, in a general application, the transmission of driving power from the PTO power transmission shaft 41 to the rear PTO shaft 32 must be done with the reduction of its speed. If the rear-PTO gear member 42a supported on the PTO power transmission shaft 41 is directly meshed with the final gear 42e supported on the rear PTO shaft 32, a pitch radius of the rear-PTO gear member 42e must be increased, which leads to increase of the distance between the PTO power transmission shaft 41 and the rear PTO shaft 32 and hence invites increased size of the transmission case 60.

In light of the above problems, the idle gear 42b and the intermediate shaft 42c are interposed between the rear-PTO gear member 42a and the final gear 42e, while the idle gear 42b and the intermediate shaft 42c are located closer to the first lateral side of the transmission case 60 than the PTO power transmission shaft 41 is, as described above. That is, as illustrated in FIG. 7, the PTO power transmission shaft 41 is located in the transmission case 60 closer to the second lateral side thereof than the PTO input shaft 31 and the running power input shaft 34 with respect to the vehicle width direction and between both the input shafts 31, 34 with respect to the vertical direction. In this arrangement, the running power transmission mechanism 50 is located only in a space of the transmission case 60 closer to the first lateral side and lower side thereof than the running power input shaft 34 is, as described above. Accordingly, there exists an empty space in the transmission case 60 closer to the rear side of the transmission case 60 along the vehicle lengthwise direction, and closer to the first lateral side than the PTO power transmission shaft 41.

In the transmission 30, the idle gear 42b and the intermediate shaft 42c are placed within the aforesaid empty space, thereby effectively preventing the increase in size of the transmission case 60, while achieving transmission of the driving power with its speed reduced from the PTO power transmission shaft 41 to the rear PTO shaft 32.

The vehicle 100 of this embodiment includes the hydraulic lift unit 400 for elevating a working unit such as a cultivating unit disposed on the rear side of the chassis 10, valve unit 410 for controlling feeding and discharging of pressurized fluid to the hydraulic lift unit 400, auxiliary pump 420 for feeding pressurized fluid to the valve unit 410, and auxiliary-pump power transmission mechanism 430 for transmitting driving power from the PTO input shaft 31 to the auxiliary pump 420.

As best illustrated in FIGS. 3–5, the hydraulic lift unit 400 includes cylinder tube 401 located along the vehicle lengthwise direction, piston head 402 reciprocably and fluid-tightly mounted in the cylinder tube 401, piston rod 403 having a front end connected with the piston head 402 and a rear end rearwardly extending through a rear opening of the cylinder tube 401, support shaft 404 supported along the vehicle width direction, arm 405 having a proximal end relatively non-rotatably supported on the support shaft 404 and a distal end connected with the rear end of the piston rod 403, and a pair of lift arms 406 having proximal ends relatively non-rotatably supported on the support shaft 404 and distal ends extending to the rear side of the chassis. According to this arrangement, the pair of lift arms 406 can be pivotally moved about the axis of the support shaft 404 by the hydraulic action of pressurized fluid applied on the piston head 402.

Reference code 405a in FIG. 4 represents a spacer for fixedly positioning the arm 405. Reference code 60f in FIG. 4 represents a breather pipe for communication between an inside air layer of the transmission case 60 and ambient air for absorbing volume variation due to temperature change of reservoir fluid.

Now, the description will be made in detail for mounting positions of the cylinder tube 401, the valve unit 410 and the auxiliary pump 420.

First, the description will be made for the position of the cylinder tube 401 with respect to the vertical direction. The cylinder tube 401 is located above the PTO input shaft 31 (or the input shaft 21a), thereby preventing interference with the PTO power transmission mechanism 40. Positioning of the cylinder tube 401 above the PTO input shaft 31 as intended herein includes positioning of the cylinder tube 401 above the PTO input shaft 31 within the transmission case 60 and on the top surface of the transmission case 60 in abutting relationship with each other.

With respect to the width direction, the cylinder tube 401 is located in the transmission case 60 closer to the first lateral side thereof along the vehicle width direction. The cylinder tube 401 also has a front opening, which is closed with the valve unit 410. The cylinder tube 401 and the valve unit 410 are aligned in series along the lengthwise direction of the vehicle in the transmission case 60 closer to the first lateral side.

Preferably, recess 410' is formed on a surface of the valve unit 410 facing the cylinder tube 401 for receiving the cylinder tube 401, thereby achieving improved efficiency in assembling the valve unit 410 and the cylinder tube 401.

On the other hand, the auxiliary pump 420 is supported within the transmission case 60 so as to be located closer to the second lateral side thereof than the valve unit 410 and the cylinder tube 401 are.

Thus, the arrangement of this embodiment, where, in the transmission case, the valve unit 410 and the cylinder tube 401 are located closer to the first lateral side of the transmission case 60, while the auxiliary pump 420 is located closer to the second lateral side of the same, produce desirable effects as described below.

In the conventional working vehicle, the valve unit and the cylinder tube are located on a top surface of the transmission case along the vehicle lengthwise direction, while the auxiliary pump for feeding pressurized fluid to the valve unit is supported on a rear wall of the transmission case. Accordingly, where reservoir fluid within the transmission case is to be fed to the cylinder tube, the reservoir fluid must be once drawn from a lower portion of the transmission case to a rear side, and then fed to the cylinder tube via the valve unit on the top surface of the transmission case. This poses a problem of causing an elongated fluid distribution path. This elongation of the fluid distribution path invites enlargement of a hydraulic pump for compensation of loss of pressure, enlargement of the vehicle due to large occupation of conduit arrangement, deterioration of response rate of a hydraulic power unit due to lowered rate of feeding pressurized fluid to the hydraulic power unit, or any other undesirable problems.

To address the above problems, as described in this embodiment, the valve unit 410 and the cylinder tube 401 are aligned in series along the vehicle lengthwise direction in the transmission case 60 closer to the first lateral side, and the auxiliary pump 420 is located within the transmission case 60 closer to the second lateral side thereof than the valve unit 410 and the cylinder tube 401 are. Hence, this arrangement can shorten the fluid distribution path for feeding working fluid from the transmission case 60 to the valve unit 410 through the auxiliary pump 420, thereby achieving downsizing of the auxiliary pump 420, downsizing of the vehicle and improved response rate of the hydraulic power unit.

The transmission case 60 is preferably provided with reservoir-fluid-take-off port 65 (see FIGS. 2 and 3) that is located substantially at the same portion as that of the auxiliary pump 420 with respect to the vehicle lengthwise direction so as to be fluidly connected with a suction port of the auxiliary pump 420. This arrangement achieves a further shortening of the fluid distribution path.

Figure 11:
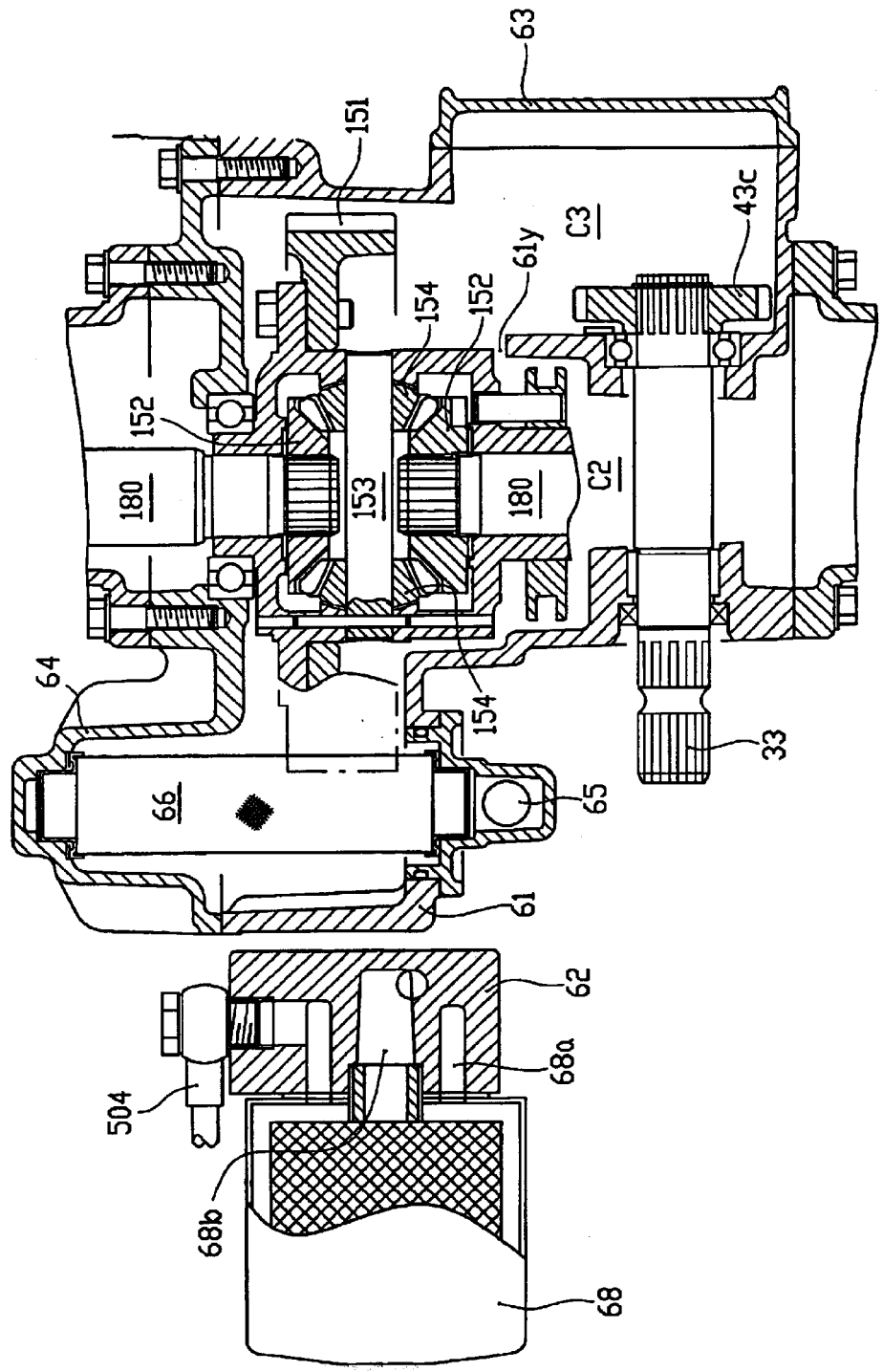
FIG. 11 is a cross section taken along lines XI—XI in FIG. 3.

FIG. 11 is a cross section taken along lines XI—XI in FIG. 3. As illustrated in FIGS. 3 and 11, it is more preferable to provide strainer 66 that is located below the middle chamber C2 within the transmission case 60 and held between the body 61 and the side cover 64 in a clamped relationship, so that reservoir fluid is taken off from the reservoir-fluid-take-off port 65 through the strainer 66. Whereby, impurities such as iron powders can effectively be removed. The reservoir-fluid-take-off port 65 is formed in a cover detachably attached to the body 61 so as to cover a side opening formed in the body 61. With this arrangement, the strainer 66 within the transmission case 60 can be accessed from the outside by removing the cover.

In this embodiment, as illustrated in FIGS. 3–5, the body 61 of the transmission case 60 is integrally formed with first bulging portion 61, which bulges upward from the body 61 at a portion closer to the first lateral side of the transmission case 60, and the cylinder tube 401 is located within this first bulging portion 61c in an attempt to lower the vehicle height by lowering the mounting position of the cylinder tube 401.

That is, the arrangement with the cylinder tube mounted on the top surface of the transmission case causes an necessities to prepare an additional part for supporting the cylinder tube and mount the cylinder tube at a higher place. Accordingly, it is likely to invite problems such as increased manufacturing cost due to increase in number of parts, and increased vehicle height. Generally, a driver's seat is located above the cylinder tube (see FIG. 1), so that the mounting of the cylinder tube at a higher place increases the height at which the driver's seat is mounted. This invites increased height of gravitational center of the vehicle and hence difficulty in getting on and off the driver's seat.

Contrarily to the above, in this embodiment, the cylinder tube 401 is placed within the first bulging portion 61c of the transmission case 60, thereby enabling the cylinder tube 401 to be mounted at a lower place with a secured support.

The arrangement with the cylinder tube 401 placed within the transmission case 60 also omits a necessity to provide a special mechanism for supporting the supporting shaft 404 on the transmission case 60. Hence, the support shaft 404 can be securely supported within the transmission case 60 with maintaining the manufacturing cost within a low level.

In this embodiment, as best illustrated in FIG. 4, the support shaft 404 is supported by the transmission case 60 so as to have opposite ends respectively and outwardly extending through both the lateral walls of the transmission case 60 to have outward extensions respectively connected with the pair of the lift arms 406.

Preferably, as best illustrated in FIGS. 3 and 7, the first bulging portion 61c has a bottom wall, on which lip 61d is provided to prevent the cylinder tube 401 from slipping rearward. As a result, the cylinder tube 401 can be held by the valve unit 410 and the lip 61d for more secured support of the cylinder tube 401.

The auxiliary-pump power transmission mechanism 430 is placed within the front chamber C1. Specifically, as illustrated in FIGS. 6 and 9, the auxiliary pump power transmission mechanism 430 includes gear train 431 that in turn includes driving-side gear 431a relatively non-rotatably supported on the PTO input shaft 31, idle gear 431b meshed with the driving-side gear 431a, and driven-side gear 431c relatively non-rotatably supported on pump shaft 421 of the auxiliary pump 420 in meshed engagement with the idle gear 431.

As best illustrated in FIG. 6, the gear train 431 is located above and on the right hand side of the PTO input shaft 31, thereby preventing interference with the PTO power transmission mechanism 40 including the PTO power transmission shaft 41 located below and on the right hand side of the PTO input shaft 31, and with the running power transmission mechanism 50 located on the left hand side of the running power input shaft 34, while achieving effective use of the space within the transmission case 60.

That is, in this embodiment, the PTO input shaft 31 and the running power input shaft 34 are aligned along the widthwise center line of the transmission case 60 in parallel adjacent relationship with each other, while the auxiliary-pump power transmission mechanism 430 driven by the PTO input shaft 31 and the PTO power transmission mechanism 40 aligned in vertically spaced apart relationship with each other are located closer to the first lateral side of the transmission case 60. Also, the running power transmission mechanism 50 driven by the running power input shaft 34 is located only in a space of the transmission case 60 closer to the second lateral side and lower side thereof. Whereby, effective use of the space within the transmission case 60 can be achieved by preventing mutual interference between these power transmission mechanisms.

Preferably, as illustrated in FIGS. 4 and 6, in a space of the body 61 of the transmission case 60 closer to its lateral side opposite to the side, closer to which the first bulging portion 61c is located, is provided second bulging portion 61e, which bulges upward from the body 61 and is adapted to be closed by the front cover 62 so as to support the auxiliary pump 420 thereon. Whereby, it is possible to securely support the auxiliary pump 420 and reduce the manufacturing cost by reducing the number of parts.

More preferably, the gear train 431 is partly placed within the closed space defined by the second bulging portion 61e and the front cover 62.

While variations are possible, in this embodiment, opening 61e' communicated with the closed space defined by the front cover 62 and the second bulging portion 61e is formed in the second bulging portion 61e, enabling the pump shaft 421 to extend into the closed space from the rear side through the opening 61e' and be relatively non-rotatably connected with the driven-side gear 431c (see FIG. 4).

Figure 16:
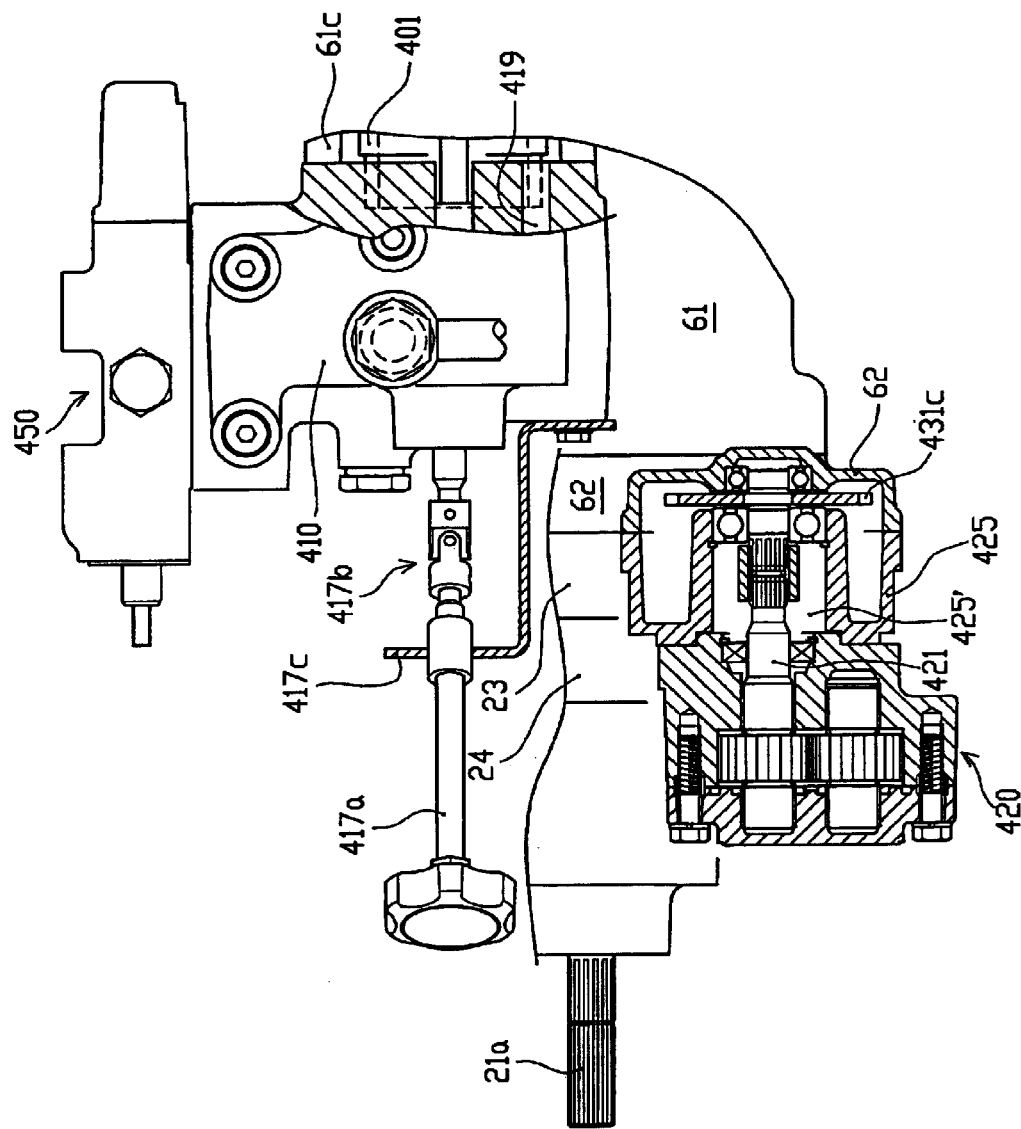
FIG. 16 is a partially cross-sectioned plan view of a modified embodiment of the transmission.

As illustrated in FIG. 16, as an alternative to the second bulging portion 61e, there may be provided pump mounting cover 425 connected to a front side of the front cover 62, thereby defining the closed space in cooperation with the front cover 62, and opening 425' communicated with the closed space is formed in the pump mounting cover 425, enabling the pump shaft 421 to extend into the closed space from the front side through the opening 425'.

Figure 17:
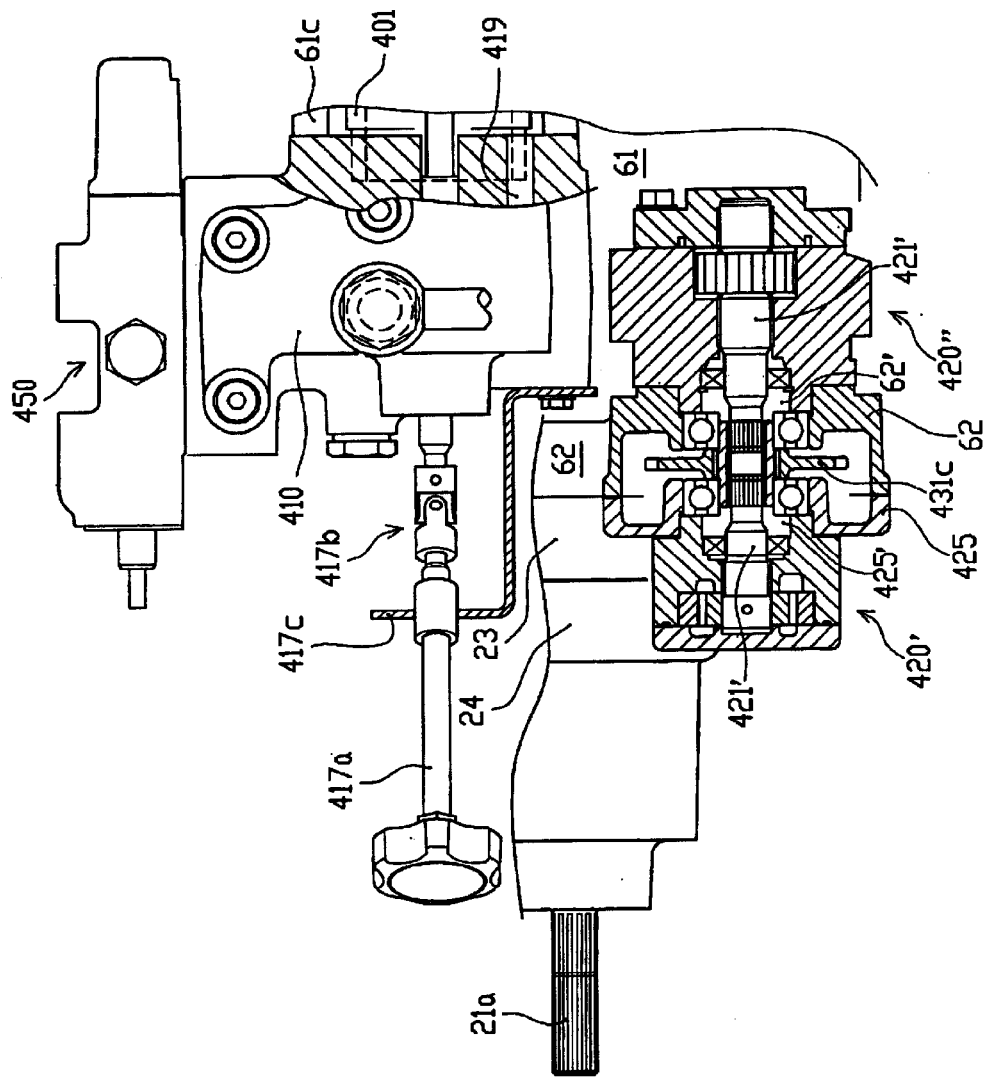
FIG. 17 is a partially cross-sectioned plan view of a modified transmission with a double-headed pump.

As illustrated in FIG. 17, where the auxiliary hydraulic pump 420 (hereinafter described) is in the form of a double-headed pump with its double pump heads aligned in tandem, openings 425' and 62' communicated with the closed space may be respectively formed in the pump mounting cover 425 and the front cover 62, and pump shafts 421', 421" are extended into the closed space through these openings from the front side of the pump mounting cover 425 and the rear side of the front cover 62, thereby arranging the double pump heads 42', 420" along the vehicle lengthwise direction. Alternatively, in use of the transmission having the above mentioned bulging portion, both the double pump heads 420', 420" may be located on either front or rear side of the bulging portion.

Now, the description will be made for a hydraulic circuit of the transmission arrangement according to this embodiment.

Figure 12:
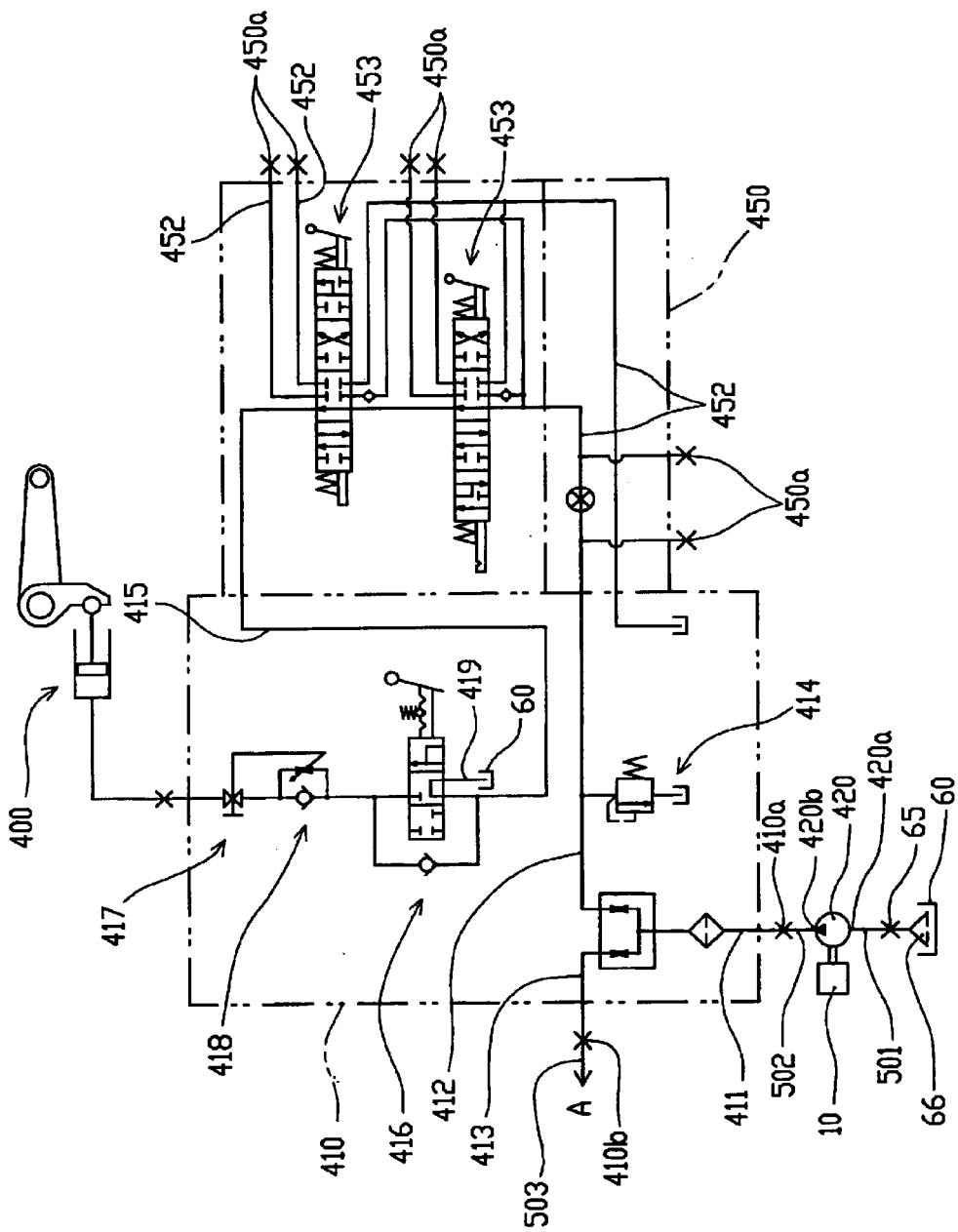
FIG. 12 is a hydraulic circuit diagram of a hydraulic lift unit and a valve unit.
Figure 14:
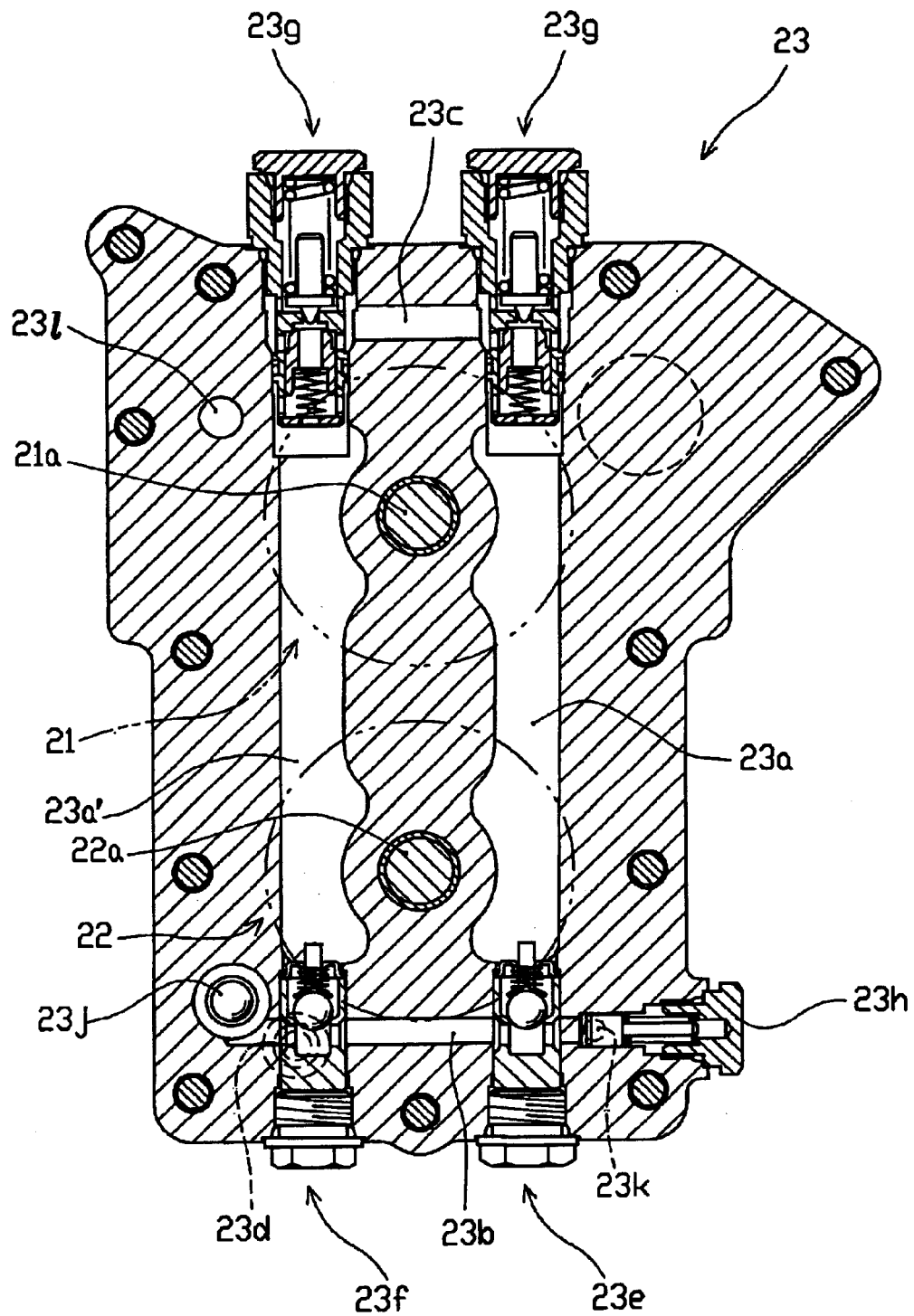
FIG. 14 is a longitudinal cross-section of the center section.

FIG. 12 is a hydraulic circuit diagram of the hydraulic lift unit 400 and the valve unit 410. FIG. 13 is a hydraulic circuit diagram of the center section and the PTO clutch unit. FIG. 14 is a longitudinal cross-section of the center section in front elevation.

The reservoir-fluid-take-off port 65 of the transmission case 60 is connected with suction port 420a of the auxiliary pump 420 installed on the top surface of the transmission case 60 via conduit 501 (see FIG. 2). That is, reservoir fluid within the transmission case 60 is filtered by the strainer 66 mounted within the middle chamber C2 of the transmission case 60, and then is sucked into the suction port 420a of the auxiliary pump 420 via the reservoir-fluid-take-off port 65 and the conduit 501.

Pressurized fluid discharged from outlet port 420b of the auxiliary pump 420 is fed into suction port 410a of the valve unit 410 aligned with the auxiliary pump 420 along the vehicle width direction via the conduit 502 (see FIG. 2).

The valve unit 410 forms therein inlet line 411 branched into first and second lines 412, 413 via flow dividing valve with its proximal end communicated with the suction port 410a provided on the top surface of the valve unit 410 and distal end incorporated into the valve unit 410.

In this embodiment, auxiliary control valve unit 450 is connected with a side wall of the valve unit 410 so as to selectively take off pressurized fluid flowing in the first line 412 via plural take-off ports. That is, the auxiliary control valve unit 450 enables pressurized fluid flowing in the first line 412 to be used for a hydraulic power unit or the like for elevating the bucket unit 111 (see FIG. 1), and tilting the same to a dump position.

As illustrated in FIGS. 4 and 12, the auxiliary control valve unit 450 includes unit body 451, a plurality of hydraulic lines 452 formed in the unit body 451, and at least one switch valve 453 (two in this embodiment) interposed in the plurality of hydraulic lines 452, so that pressurized fluid introduced through one of the hydraulic lines can be taken off through a plurality of take-off ports 450*a*. In this embodiment, two of the plurality of take-off ports 450*a* are formed in the top surface of the valve unit 410 (see FIG. 4).

The first line 412 has an end opening to the outside through the side wall of the valve unit via high-pressure relief valve 414 for setting hydraulic pressure of the first line 412 and communicated with one of the hydraulic lines of the auxiliary control valve unit 450.

The valve unit 410 is designed to be capable of closing the front opening of the cylinder tube 401 with its recess 410', as described above.

The valve unit 410 is also provided with working-fluid line 415 (see FIGS. 3, 4 and 12) that has a proximal end communicated with the first line 412 via the auxiliary control valve unit 450 and a distal end opening to the inside of the cylinder tube 401 via the recess 410'.

In the working-fluid line 415 is interposed elevational-movement switch valve 416 and stop valve 417, both of which are designed to be capable of being operated from the outside. The stop valve 417 is equipped with slow-return valve 418 for preventing abrupt downward movement of the lift arms 406 (see FIG. 12).

In this embodiment, as best illustrated in FIG. 3, the stop valve 417 is located in a horizontal orientation, while operating member 417*a* thereof is located in an upwardly slanting orientation. Specifically, the stop valve 417 is connected with the operating member 417*a* via universal joint 417*b*, which has a driving-side member supported in an upwardly slanting orientation by stay 417*c* secured on the valve unit 410.

Reference code 416*a* in FIGS. 4 and 5 represents a link mechanism for operating the elevational-movement switch valve 416, which is connected with elevational-movement operating lever 416*b* for switching the switch valve 416 to any one of "RAISE", "NEUTRAL", and "LOWER". Actions taken by the lift arms 406 are fed back to the elevational-movement operating lever 416*b*, so that where an end of the lift arms 406 reaches a predetermined upper limit (or lower limit) upon switching the switch valve 416 from the neutral position to the raising position (or lowering position), an action of the lift arms 406 is fed back to the elevational-movement operating lever 416*b*, which is then forced to return to the neutral position.

Reference code 419 in FIGS. 4, 5 and 12 represents a drain line for returning drained fluid discharged through the elevational-movement switching valve 416 into the transmission case 60. In this embodiment, the drain line 419 is open to the first bulging portion 61*c*, so that drained fluid is flown from the first bulging portion 61*c* into the rear chamber C3 of the transmission case 60. More preferably, the rear chamber C3 is provided with inner wall 61*f* for temporarily receiving return fluid from the drain line 419 (see FIG. 3). This inner wall 61*f* can cool return fluid heated to a high temperature coming from the drain line 419.

On the other hand, the second line 413 has a distal end communicated with discharge port 410*b* formed in the top surface of the valve unit 410, to which optionally provided hydraulic circuit 500 for power-steering unit, hydraulic circuit 600 for the PTO clutch unit 70, and first charge line 23*d* of the HST are connected through conduit 503 (see FIGS. 4, 12 and 13).

Figure 18:
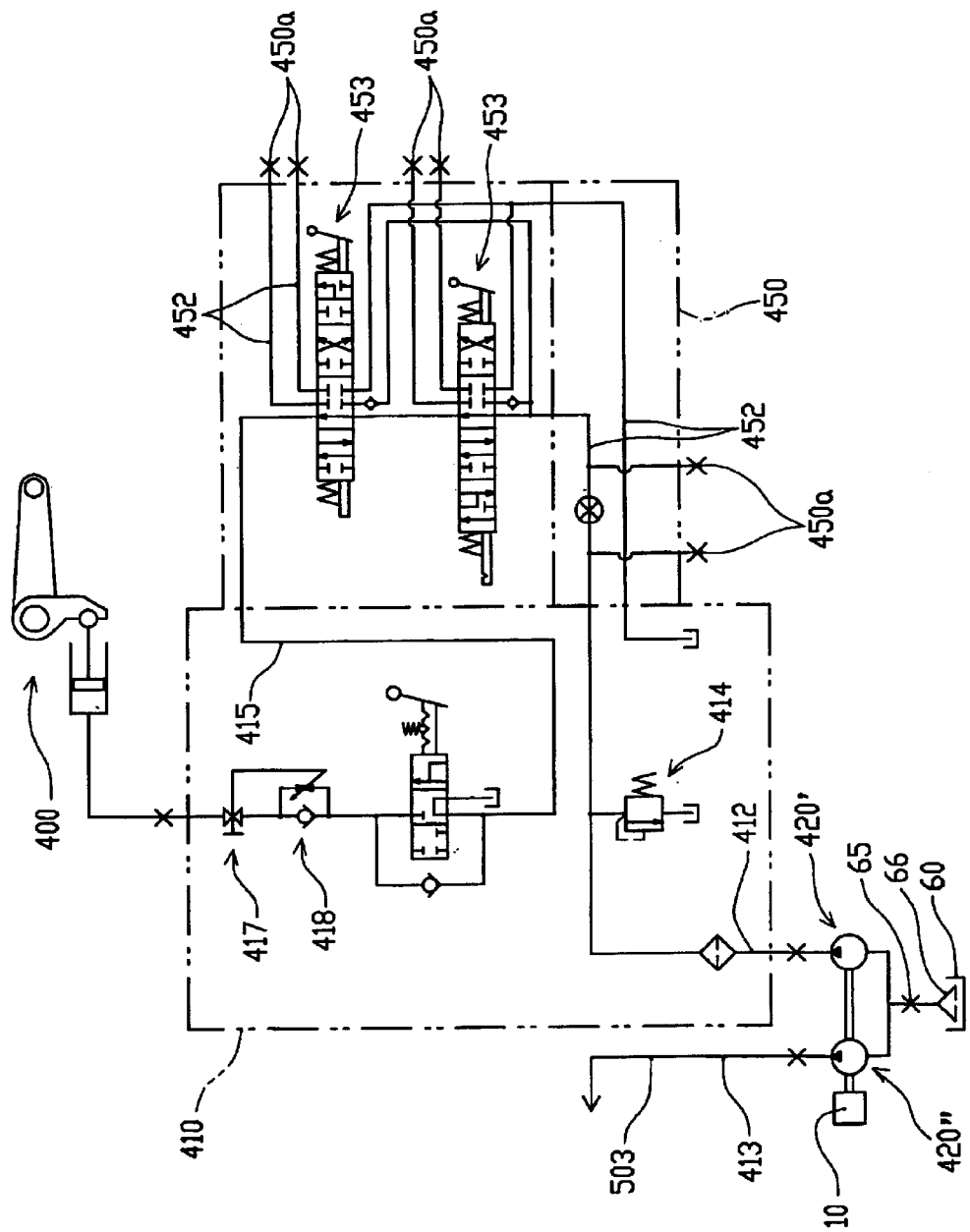
FIG. 18 is a hydraulic circuit diagram of the hydraulic lift unit and the valve unit where the transmission is equipped with double-headed pump.

In this embodiment, hydraulic fluid discharged from the single auxiliary pump 420 is divided into first and second lines 412, 413 by using the flow dividing valve. In this respect, where temperature rise in hydraulic fluid accompanied by the operation of the flow dividing valve poses a problem, it is possible to omit the flow dividing valve and alternatively employ the arrangement where the double headed pump with its heads 420', 420" connected in tandem is employed as the auxiliary pump 420, while a discharge port of one pump head 420' is connected with the first line 412 and a discharge port of another pump head 420" is connected with the second line 413, as illustrated in FIG. 18. Thus, the problem as mentioned above can be resolved.

As illustrated in FIG. 13, the hydraulic circuit 600 for the PTO clutch unit includes suction line 601 that has a proximal end directly communicated with the end of the second line 413 or indirectly communicated with the same via the hydraulic circuit 500 for the power-steering unit, PTO line 602 and HST line 603 branched from the suction line 601, switch valve 604 interposed in the PTO line 602, and high-pressure relief valve 605 interposed in the HST line 603.

In this embodiment, as illustrated in FIG. 5, valve assembly 650 mainly constituting the hydraulic circuit 600 for the PTO clutch unit is installed on an upper outer surface of the side cover 64 of the transmission case 60.

Specifically, the valve assembly 650 is provided with inlet port 600*a*, into which pressurized fluid is fed, the suction line 601 having an end communicated with the inlet port 600*a*, the PTO line 602 and the HST line 603 branched from the suction line 601, the switch valve 604 interposed in the PTO line 602, the high-pressure relief valve 605 interposed in the HST line 603, and outlet port 600*b* communicated with a distal end of the HST line 603 (see FIGS. 5 and 12).

The PTO line 602 is communicated with the hole 615 formed in the side cover 64 of the transmission case 60 (see FIG. 9). Whereby, pressurized fluid fed from the PTO line 602 is adapted to be capable of affecting the clutch pressing member 75 of the PTO clutch unit 70 and the brake pressing member 83 of the PTO brake mechanism 80 respectively through the clutch line 611 and the brake line 612, which are branched from the PTO line 602 by the manifold 616, which acts as pressurized-fluid divider (see FIGS. 5 and 9).

The HST line 603 is communicated with the center section 23 through conduit 504 connected with the outlet port 600*b* (see FIGS. 6 and 13) and line filter 68, which is supported on a lower outer surface of the front cover 62 with performing a bypass function necessary for coping with clogging (see FIGS. 2, 3 and 6).

Figure 15:
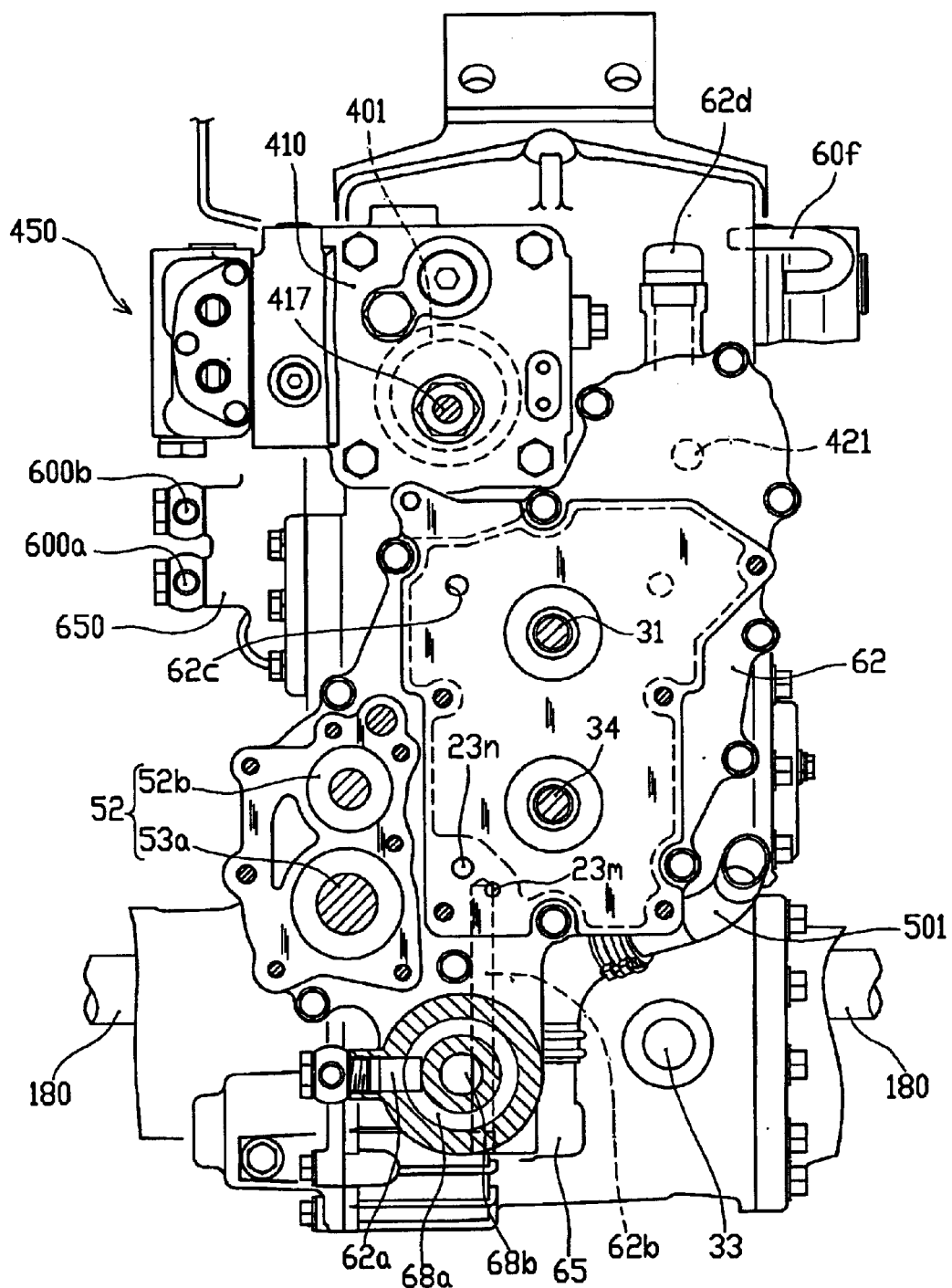
FIG. 15 is a front view of a transmission case with the center section removed.

FIG. 15 is a front view of the transmission case 60 with the center section removed. As illustrated in FIG. 15, the front cover 62 of the transmission case 60 forms therein filter suction line 62*a* that has a first end communicated with the HST line 603 via the conduit 504 and a second end communicated with suction port 68*a* of the line filter 68, and filter discharge line 62*b* that has a first end communicated with discharge port 68*b* of the line filter 68 and a second end opening to the outside through a surface of the front cover 62 for supporting the center section. The second end of the filter discharge line 62*b* opening to the outside forms first charge port 23*m* (see FIGS. 13 and 15). The front cover 62 also forms therein suction line 23*p* that has a first end opening to the outside through its supporting surface for supporting the center section to form second charge port 23*n* and a second end opening to the inside of the transmission case 60.

As described above, in this embodiment, since the HST line 603 is fed with working fluid which is filtered by the strainer 66 located in the transmission case 60, the line filter 68 may be manufactured in reduced size. That is, if iron powders or the like are contained in the HST line 603, they may invite malfunction or any other problems in the HST 20 located on the downstream side. To address this problem, a large-sized, high-performance line filter must usually be provided. On the contrary, in this embodiment, the strainer 66 is provided to filter working fluid to some extent, as described above, so that the number of times by which an expensive line filter must be replaced with a new one can be drastically reduced, and a large-sized filter with such a high performance required in the conventional arrangement is not required. Even if the line filter 68 is clogged, hydraulic fluid sucked flows into the HST 20, bypassing the line filter 68. As a result, there may occur no destruction of the HST 20.

As illustrated in FIGS. 13 and 14, the center section 23 is provided with a pair of hydraulic lines 23a, 23a' for hydraulic connection between the hydraulic pump body 21 and the hydraulic motor 22 of the HST 20, first and second bypass lines 23b, 23c for connection between the pair of hydraulic lines 23a, first charge line 23d with its first end communicated with the first charge port 23m and second end communicated with the first bypass line 23b, check valve 23e interposed in the first bypass line 23b between its connection point with first hydraulic line 23a and connection point with the charge line 23d, check valve 23f with a throttle valve, which is interposed in the bypass line 23b between its connection point with second hydraulic line 23a' and connection point with the charge line 23d, a pair of high-pressure relief valve 23g with a check valve, which are interposed in the second bypass line 23c, charge relief valve 23h interposed in the first charge line 23d for setting a maximum hydraulic pressure in the first charge line 23d, second charge line 23i with its first end communicated with the second charge port 23n and second end connected with the first charge line 23d, suction check valve 23j interposed in the second charge line 23i, and discharge line 23k for discharging relief fluid from the charge relief valve 23h into the HST casing 24.

The center section 23 also forms therein drain hole 231 that is located above the pump shaft 21a, and has a first end opening to the inside of the HST casing 24 and a second end opening to the outside through an abutting surface against the front cover 62 (see FIGS. 9, 13 and 14). More specifically, the front cover 62 forms therein communication hole 62c for communication between the drain hole 231 and the front chamber C1 of the transmission case 60, so that drain fluid discharged into the HST casing 24 flows into the front chamber C1 of the transmission case 60. Also, an entrance port of the suction check valve 23j opening to the outside of the center section 23 is formed in the center section 23 as being located below the motor shaft 22a and communicated with the second charge port 23n of the front cover 62 in a face-to-face relationship with each other.

The second charge line 23i and the suction valve 23j are to prevent occurrence of negative pressure in the pair of hydraulic lines 23a, 23a where the vehicle is parked on a slope with its engine stopped, thereby preventing the vehicle from rolling down the slope (free wheel phenomenon).

In the power transmission arrangement according to this embodiment, pressurized fluid from the auxiliary pump 420 is fed to the hydraulic lift unit 400, the power-steering unit, the HST 20, the PTO brake mechanism 80 and the PTO clutch unit 70 in an attempt to reduce the number of parts by omitting the necessity to provide an additional pump and hence achieve downsizing and low manufacturing cost of the vehicle.

Now, the description will be made for circulation path of hydraulic fluid reserved in the transmission case 60.

The reserved hydraulic fluid within the transmission case 60 is sucked into the auxiliary pump 420 via the strainer 66 located below the middle chamber C2 in the transmission case 60. Pressurized fluid discharged from the auxiliary pump 420 is branched into the first line 412 and the second line 413.

Primarily, pressurized fluid branched off into the first line 412 acts as working fluid for the hydraulic lift unit 400. Return fluid from the hydraulic lift unit 400 is returned into the rear chamber C3 via the first bulging portion 61c, as described above. The return fluid into the rear chamber C3 is then cooled through the inner wall 61f in this embodiment. The return fluid returned into the rear chamber C3 flows into the middle chamber C2 via the fluid communication opening 61y, as acting as lubricant for members placed within the rear chamber C3, such as the rear PTO gear train 42 and the mid-PTO power transmission gear train 43. Then, it is again sucked into the auxiliary pump 420.

On the other hand, pressurized fluid branched off into the second line 413 is fed into the HST 23 as replenishing fluid via the optionally provided power-steering unit and the PTO clutch unit 70. Return fluid from the HST 23 is returned into the front chamber C1 of the transmission case 60, as described above. Then, this return fluid in the front chamber C1, which then flows out of the front chamber C1 as acting as lubricant for members placed within the front chamber C1, such as the running power transmission mechanism 50, the PTO clutch unit 70, the front-wheel-driving-power-take-off unit 53 and the auxiliary-pump power transmission mechanism 430, and passes the intermediate chamber C4, once flows into the rear chamber C3 via the fluid communication opening 61x, then flows into the middle chamber C2 via the fluid communication opening 61y, and is again sucked into the auxiliary pump 420.

Thus, in this embodiment, return fluid of high temperature from the HST 23, the hydraulic lift unit 400 or the like is prevented from circulating without some detouring, thereby effectively preventing deterioration in operational efficiency of the HST, the hydraulic lift unit and the like.

That is, return fluid from the HST 23, the hydraulic lift unit 400 or the like is heated to high temperature, which imparts a low viscosity to the return fluid. Accordingly, if the return fluid with a low viscosity is simply returned, there may cause increase in the amount of leakage of hydraulic fluid through respective positions of the auxiliary pump 420, the HST 23 and the hydraulic lift unit 400, which results in deteriorated efficiency of the hydraulic pump, HST and/or hydraulic power unit.

On the contrary, in this embodiment, hydraulic fluid is so circulated that a stream of return fluid from the HST 23 and a stream of the same from the hydraulic lift unit 400 respectively flow into the front chamber C1 and the rear chamber C3, then return to the middle chamber C2 and then again flow out of the middle chamber C2 for circulation. Accordingly, return fluid of high temperature is sufficiently cooled before flowing into the middle chamber C2, thereby preventing the aforementioned adverse effects caused by circulation of the high temperature fluid.

According to a more preferable arrangement, the brake mechanism 210 is placed within the intermediate chamber C4, which is located within the transmission case 61 closer to the first lateral side than the middle chamber C2 along the vehicle width direction, while the intermediate chamber C4 is so constructed as to enable hydraulic fluid to flow from the front chamber C1 thereinto and then flow out into the middle chamber C2 (see FIG. 8). Whereby, hydraulic fluid is unlikely to stay within the intermediate chamber C4, so that friction heat generated during the operation of the brake mechanism 210 can effectively be released. As a result, it is possible to achieve downsizing of the unit and improved durability.

Reference code 61z in FIG. 8 represents a fluid communication hole for communication between the front chamber C1 and the intermediate chamber C4. Reference code 62d in FIG. 6 represents fluid tap threaded into an opening formed in the front cover 62. The fluid tap 62d is preferably located above the auxiliary-pump power transmission mechanism 430.

This specification is by no means intended to restrict the present invention to the preferred embodiments set forth therein. Various modifications to the power transmission arrangement and the transmission for a working vehicle, as described herein, may be made by those skilled in the art without departing from the spirit and scope of the present invention as defined in the appended claims.

What is claimed is:

1. A power transmission arrangement in a working vehicle with a working unit mounted thereto comprising:

an input shaft supported by a transmission case for receiving driving power for driving the working unit from a driving source;

a hydraulic power unit for the working unit and a valve unit for controlling feeding and discharging of pressurized fluid for said hydraulic power unit are connected with each other along a vehicle lengthwise direction within the transmission case closer to an upper side thereof or on a top surface of the transmission case, and closer to a first lateral side of the transmission case along the vehicle width direction;

a hydraulic pump driven through said input shaft is located closer to a second lateral side along the vehicle width direction than the hydraulic power unit and the valve unit are;

a fluid distribution path is arranged so that hydraulic fluid reserved within the transmission case is drawn around a lower side of the hydraulic pump and then fed into the hydraulic pump through a suction port thereof; and said hydraulic pump has a discharge port connected with a suction port of the valve unit.

2. A power transmission arrangement according to claim 1, further comprising:

a filter located within the transmission case closer to a lower side thereof and substantially at the same position as that of the hydraulic pump with respect to the vehicle lengthwise direction; and the fluid distribution path arranged so that the hydraulic fluid reserved within the transmission case is fed into the suction port of the hydraulic pump through said filter.

3. A power transmission arrangement in a working vehicle with a working unit mounted thereto in such a manner as to be vertically movable through a lift arm comprising:

an input shaft for receiving driving power for driving the working unit from a driving source supported by a transmission case with a first bulging portion upwardly bulging at a position closer to a first lateral side of the transmission case along a vehicle width direction;

a hydraulic power unit for the working unit including a cylinder tube extending in a vehicle lengthwise direction, a piston reciprocably and fluid-tightly mounted within said cylinder tube and a supporting shaft operatively connected with said piston in such a manner as to be rotatable around its axis based upon reciprocal movement of the piston, in which said cylinder tube is located within a space defined by the first bulging portion, and the supporting shaft is supported by the transmission case so as to extend along the vehicle width direction and have at least one of first and second ends extending to the outside of the transmission case to form an outer extension, with which the lift arm is connected;

a hydraulic pump for feeding pressurized fluid into the hydraulic power unit located on a top surface of the transmission case closer to a second lateral side along the vehicle width direction than said first bulging portion is; and said input shaft being arranged so that driving power for the hydraulic pump is taken off therethrough.

4. A power transmission arrangement according to claim 1, wherein:

said transmission case is formed with a second bulging portion upwardly bulging at a position substantially at the same position as that of the hydraulic pump with respect to the vehicle width direction; and said hydraulic pump is supported on said second bulging portion.

5. A power transmission arrangement according to claim 2, wherein:

said transmission case is formed with a second bulging portion upwardly bulging at a position substantially at the same position as that of the hydraulic pump with respect to the vehicle width direction; and said hydraulic pump is supported on said second bulging portion.

6. A power transmission arrangement according to claim 3, wherein:

said transmission case is formed with a second bulging portion upwardly bulging at a position substantially at the same position as that of the hydraulic pump with respect to the vehicle width direction; and said hydraulic pump is supported on said second bulging portion.

7. A power transmission arrangement according to claim 4, further comprising at least a drive train extending from said input shaft to said hydraulic pump so that at least a portion thereof is placed within a space defined by said second bulging portion.

8. A power transmission arrangement according to claim 5, further comprising at least a drive train extending from said input shaft to said hydraulic pump so that at least a portion thereof is placed within a space defined by said second bulging portion.

9. A power transmission arrangement according to claim 6, further comprising at least a drive train extending from said input shaft to said hydraulic pump so that at least a portion thereof is placed within a space defined by said second bulging portion.

10. A power transmission arrangement according to claim 3, further comprising:

a valve unit for controlling feeding and discharging of pressurized fluid for said hydraulic power unit connected with said cylinder tube so as to close one of open ends of the cylinder tube, said one of open ends being positioned opposite to another side of the cylinder tube, on which said supporting shaft is located;

a fluid distribution path being arranged so that hydraulic fluid reserved within the transmission case is drawn around a lower side of the hydraulic pump and then fed into the hydraulic pump through a suction port thereof; and said hydraulic pump having a discharge port connected with a suction port of the valve unit.

11. A power transmission arrangement according to claim 4, wherein:
- a valve unit for controlling feeding and discharging of pressurized fluid for said hydraulic power unit connected with said cylinder tube so as to close one of open ends of the cylinder tube, said one of open ends being positioned opposite to another side of the cylinder tube, on which said supporting shaft is located;
- a fluid distribution path being arranged so that hydraulic fluid reserved within the transmission case is drawn around a lower side of the hydraulic pump and then fed into the hydraulic pump through a suction port thereof; and
- said hydraulic pump having a discharge port connected with a suction port of the valve unit.

12. A power transmission arrangement according to claim 7, wherein:
- a valve unit for controlling feeding and discharging of pressurized fluid for said hydraulic power unit is connected with said cylinder tube so as to close one of open ends of the cylinder tube, said one of open ends being positioned opposite to another side of the cylinder tube, on which said supporting shaft is located;
- a fluid distribution path is so arranged that hydraulic fluid reserved within the transmission case is drawn around a lower side of the hydraulic pump and then fed into the hydraulic pump through a suction port thereof; and
- said hydraulic pump has a discharge port connected with a suction port of the valve unit.

13. A power transmission arrangement according to claim 10, wherein
- a filter is located within the transmission case closer to a lower side thereof and substantially at the same position as that of the hydraulic pump along the vehicle lengthwise direction; and
- a fluid distribution path is so arranged that the hydraulic fluid reserved within the transmission case is fed into the suction port of the hydraulic pump through said filter.

* * * * *